United States Patent
Gjoka et al.

(10) Patent No.: US 11,835,501 B2
(45) Date of Patent: Dec. 5, 2023

(54) OPTIMIZING OPERATING BINDING CAPACITY FOR A MULTIPLE COLUMN CHROMATOGRAPHY PROCESS

(71) Applicant: Sartorius Stedim Chromatography Systems Ltd., Royston (GB)

(72) Inventors: Xhorxhi Gjoka, Worcester, MA (US); Karl K. Rogler, Lincoln, MA (US); Mark J. Schofield, N. Grafton, MA (US)

(73) Assignee: Sartorius Stedim Chromatography Systems Ltd., Royston (GB)

( * ) Notice: Subject to any disclaimer, the term of this patent is extended or adjusted under 35 U.S.C. 154(b) by 563 days.

(21) Appl. No.: 14/797,785

(22) Filed: Jul. 13, 2015

(65) Prior Publication Data

US 2017/0016864 A1    Jan. 19, 2017

(51) Int. Cl.
*G01N 30/86* (2006.01)
*G01N 30/88* (2006.01)
(Continued)

(52) U.S. Cl.
CPC ..... *G01N 30/8658* (2013.01); *B01D 15/1864* (2013.01); *G01N 30/461* (2013.01);
(Continued)

(58) Field of Classification Search
USPC .............................. 210/656, 198.2
See application file for complete search history.

(56) References Cited

U.S. PATENT DOCUMENTS

| | | |
|---|---|---|
| 4,861,488 A | 8/1989 | Kenney et al. |
| 6,153,438 A | 11/2000 | Blumberg et al. |

(Continued)

FOREIGN PATENT DOCUMENTS

| | | |
|---|---|---|
| AU | 2016023494 | 2/2017 |
| CA | 2930594 | 9/2019 |

(Continued)

OTHER PUBLICATIONS

Singapore Patent Office, Search Report in counterpart Singapore Application No. 10201603826U, dated Sep. 8, 2016.

(Continued)

*Primary Examiner* — Kara M Peo
(74) *Attorney, Agent, or Firm* — Klarquist Sparkman, LLP

(57) ABSTRACT

Determining optimum operating binding capacity for a MCC process using one column, the process including N number of columns, comprises loading target product on a first column at a first residence time and/or flow rate;

loading the product on the column at a second residence time and/or flow rate, the first residence time and/or flow rate being different than the second residence time and/or flow rate;

generating a first breakthrough curve for the first residence time and/or flow rate and a second breakthrough curve for the second residence time and/or flow rate, wherein the first curve represents product breakthrough for the first column and the second curve represents product breakthrough for an Nth column; and using the curves to determine product loading capacity of the first column before product breakthrough at the Nth column; the product loading capacity of the first column equaling optimum operating binding capacity for the process.

5 Claims, 9 Drawing Sheets

(51) Int. Cl.
    *B01D 15/18*      (2006.01)
    *G01N 30/46*      (2006.01)

(52) U.S. Cl.
    CPC ............. *G01N 30/46* (2013.01); *G01N 30/86* (2013.01); *G01N 2030/889* (2013.01)

(56) References Cited

U.S. PATENT DOCUMENTS

| | | |
|---|---|---|
| 6,294,090 B1 | 9/2001 | Nussbaumer et al. |
| 6,494,078 B1 | 12/2002 | Klee |
| 6,915,227 B2 | 7/2005 | Quimby et al. |
| 7,216,039 B2 | 5/2007 | Golushko |
| 2004/0266896 A1 | 12/2004 | Britsch et al. |
| 2010/0004907 A1 | 1/2010 | Kidal et al. |
| 2010/0181254 A1 | 7/2010 | Graalfs |
| 2011/0073548 A1 | 3/2011 | Williams et al. |
| 2011/0232373 A1 | 9/2011 | Desmet et al. |
| 2012/0091063 A1 | 4/2012 | Bangtsson et al. |
| 2013/0213884 A1* | 8/2013 | Lacki ................. B01D 15/1871 210/635 |
| 2014/0008300 A1 | 1/2014 | Fauquet |
| 2014/0299547 A1* | 10/2014 | Muller-Spath ..... B01D 15/1871 210/656 |

FOREIGN PATENT DOCUMENTS

| | | |
|---|---|---|
| CN | 102472731 A | 5/2012 |
| CN | 102909105 A | 2/2013 |
| CN | 103180727 A | 6/2013 |
| CN | 106353440 | 5/2019 |
| EP | 2 339 339 A1 | 6/2011 |
| EP | 2 551 013 A1 | 1/2013 |
| EP | 2 656 892 A1 | 10/2013 |
| EP | 2 772 466 A1 | 9/2014 |
| EP | 3118620 | 1/2017 |
| JP | 2014202749 | 10/2014 |
| KR | 101987400 | 6/2019 |
| SG | 10201603826 | 2/2017 |
| WO | WO 1999/34220 A2 | 7/1999 |
| WO | WO 2010/151214 A1 | 12/2010 |
| WO | WO 2011/147974 A1 | 6/2011 |
| WO | WO 2011/094264 A1 | 8/2011 |
| WO | WO 2012/057676 A1 | 5/2012 |
| WO | WO 2014/166799 A1 | 10/2014 |

OTHER PUBLICATIONS

Holzer, M., et al., "Multicolumn Chromatography: A New Approach to Relieving Capacity Bottlenecks for Downstream Processing Efficiency," *BioProcess International*, pp. 74-78 (2008).

Bisschops, M., et al., "The impact of continuous multicolumn chromatography on biomanufactoring efficiency," *Pharmaceutical Bioprocessing*, 1(4): 361-372 (2013).

Chinese Patent Office, Office Action in Counterpart Chinese Application No. 201610642063, datled Jul. 19, 2017.

Extended European Search Report of European Application No. 16 169 704.0, dated Aug. 8, 2016, 7 pages.

Office Action for Canadian Application No. 2930594, dated Feb. 22, 2018.

Office Action for Canadian Application No. 2930594, dated Sep. 17, 2018.

Office Action for Chinese Application No. 2016106422603.3, dated Feb. 13, 2018. (w/English translation).

Office Action for Chinese Application No. 2016106422603.3, dated Sep. 18, 2018. (w/English translation).

Office Action for Korean Application No. 10-2016-0067592, dated Jul. 30, 2018 (w/English translation).

Office Action for Korean Application No. 10-2016-0067592, dated Feb. 22, 2019 (w/English translation).

Sen et al., "Immobilization and chromium adsorption characteristic of biosorption fusion strain," *Chinese Journal of Environmental Engineering*, 4(8):1785-1789 (Aug. 2010) (w/English abstract).

* cited by examiner

OPTIMIZING OPERATING BINDING CAPACITY FOR A MULTIPLE COLUMN CHROMATOGRAPHY PROCESS

BACKGROUND OF THE INVENTION

Column chromatographic separation typically utilizes a column having an inlet and an outlet and containing a sorbent for binding desired molecules (target product) present in a sample fluid, such that the target product is bound and separated from other molecules in the sample fluid as the fluid passes through the column.

A column chromatography cycle involves several stages conducted one after the other. The "loading" stage involves loading the column by passing the sample fluid (the feed) through the inlet, such that the feed contacts the sorbent, and some amount of the target product is bound. The amount of target product bound to the sorbent in the column is referred to as the binding capacity of the column. Unbound target product, and other molecules (that may include contaminants), pass with fluid through the outlet. Other stages in the chromatography cycle include, for example, washing the column, eluting the target product, regenerating the sorbent, and equilibrating the column.

Multiple column chromatography (MCC) involves loading two or more chromatography columns connected in series, wherein feed sample is passed from the inlet of a first chromatography column (containing sorbent), through the outlet of the first column and into the inlet of a second chromatography column (containing sorbent), through the outlet of the second column, and so on, depending on how many columns are connected. This allows the first column to be over-loaded and the target product passing from the first column (that would otherwise by lost to waste) is captured by a subsequent column. In MCC, one column can be loaded while another stage in the cycle can be carried out on another column. When a first column is over-loaded and the target product is passed to a second column, this can be referred to as a "second pass" as the over-loaded target product is passing into the second column. Depending on the number of columns, there can be a third pass as the over-loaded target product is passing into a third column, and so on. For a complete chromatography cycle, each of the columns must progress through each of the stages, e.g., "second pass" (over-load from previous column), "load" (feed loaded directly into column), wash, elute, regenerate, and equilibrate.

However, MCC is complicated, and there is a need for improved MCC process development.

BRIEF SUMMARY OF THE INVENTION

In one embodiment, a method for optimizing operating binding capacity for a multiple column chromatography (MCC) process is provided, the method comprising (a) loading a target product on a column at a first residence time and/or at a first flow rate; (b) loading the target product on the column at a second residence time and/or at a second flow rate, wherein the first residence time and/or first flow rate is different than the second residence time and/or the second flow rate; (c) generating breakthrough curves for the first residence time and/or first flow rate and for the second residence time and/or the second flow rate; and (d) determining an optimum operating binding capacity for the MCC process. Typically, the second residence time is about double the first residence time and/or the second flow rate is about half the first flow rate.

In an embodiment, the method further comprises (b') loading the target product on the column at a third residence time and/or at a third flow rate, wherein the third residence time and/or third flow rate is different than the first and second residence times and/or the first and second flow rates; (c') generating breakthrough curves for the first residence time and/or first flow rate, for the second residence time and/or the second flow rate, and for the third residence time and/or the third flow rate; and (d) determining an optimum operating binding capacity for the MCC. Typically, the third residence time is about triple the first residence time and/or the third flow rate is about one-third the first flow rate.

In another embodiment, a method for optimizing operating binding capacity for a multiple column chromatography (MCC) process comprises (a) connecting at least two columns of equal size in series; (b) loading target product on the columns at a constant flow rate to provide predetermined residence times through the columns; and (c) determining an optimum operating binding capacity for the MCC process.

BRIEF DESCRIPTION OF THE SEVERAL VIEWS OF THE DRAWING(S)

FIGS. 1A, 1B, and 1C show, diagrammatically, flow ("load," "$2^{nd}$ pass," and "rest") through 3 columns during a single MCC chromatography cycle, wherein "rest" refers to wash, elute, regenerate, and equilibrate.

Figure 4A:
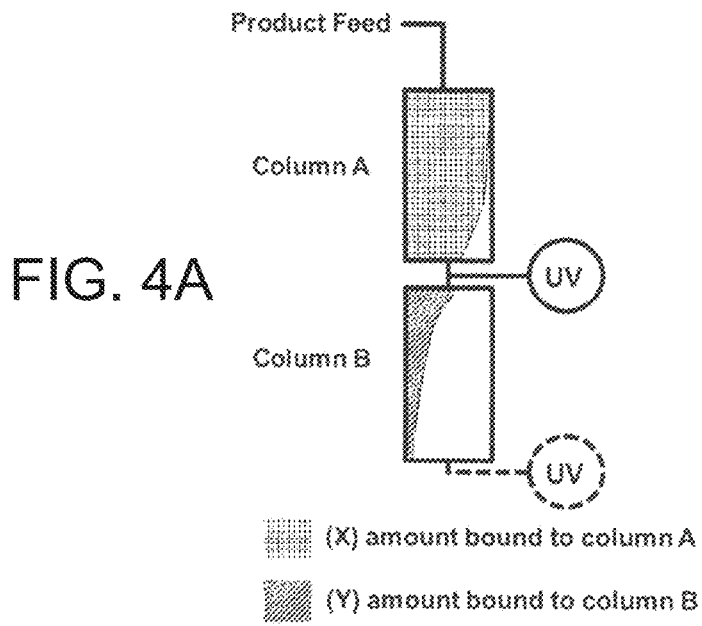
Figure 4B:
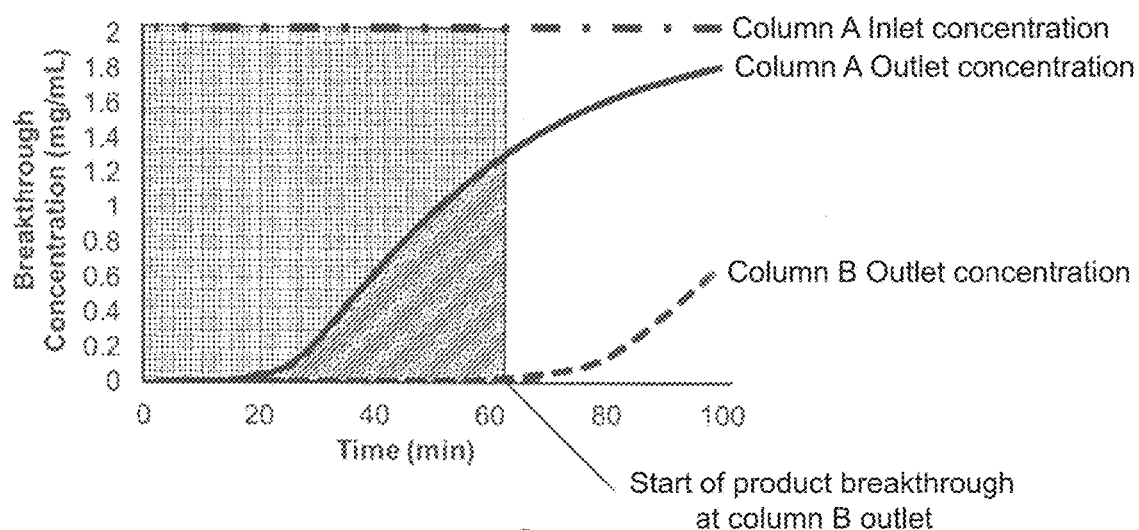
Figure 4C:
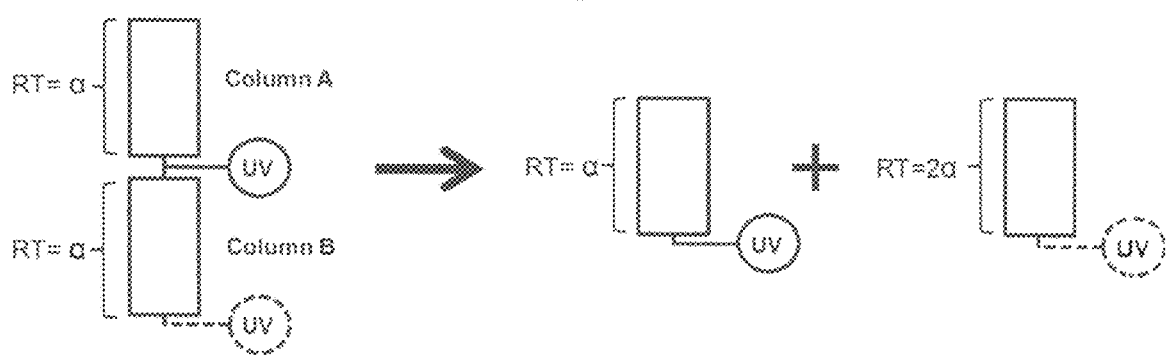

FIG. 4A shows, illustratively, two interconnected columns, each connected to a UV detector; FIG. 4B shows illustrative breakthrough curves produced by each detector. These curves can be used to calculate the amount bound to the first column before product breakthrough occurs on the last; FIG. 4C shows, illustratively, a graphical representation of the relationship between residence time and number of columns.

Figure 5:
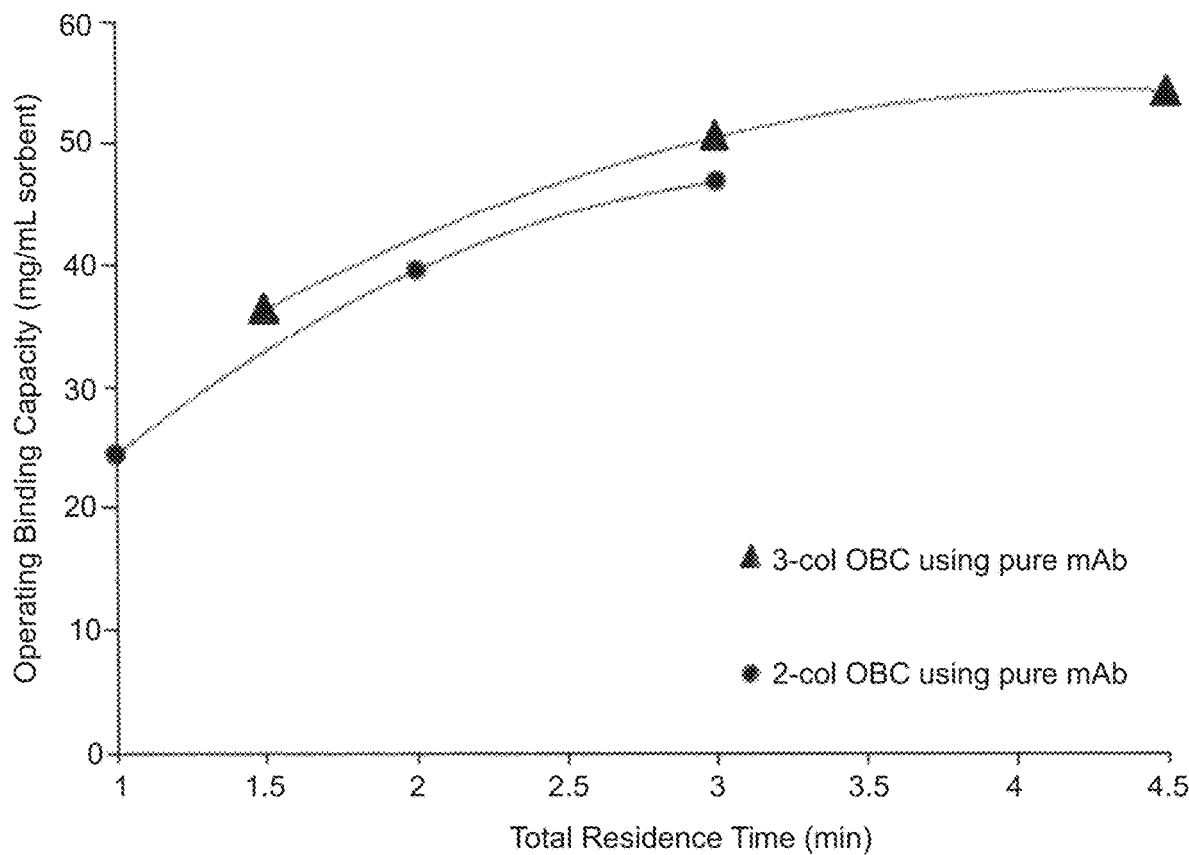

FIG. 5 shows illustrative operating binding capacities versus total residence time for two and three columns as described in Examples 1 and 3-7.

Figure 6:
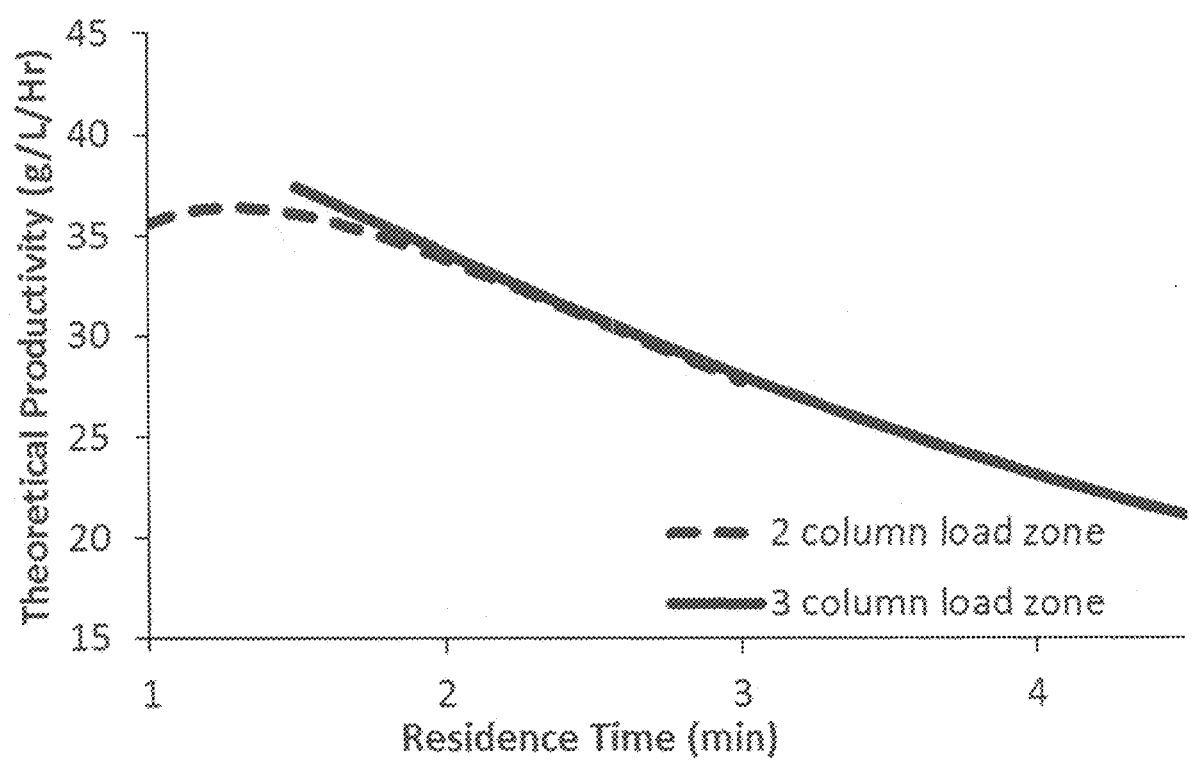

FIG. 6 shows theoretical productivity versus total residence time for two and three columns as described in Examples 1 and 3-7.

Figure 7:
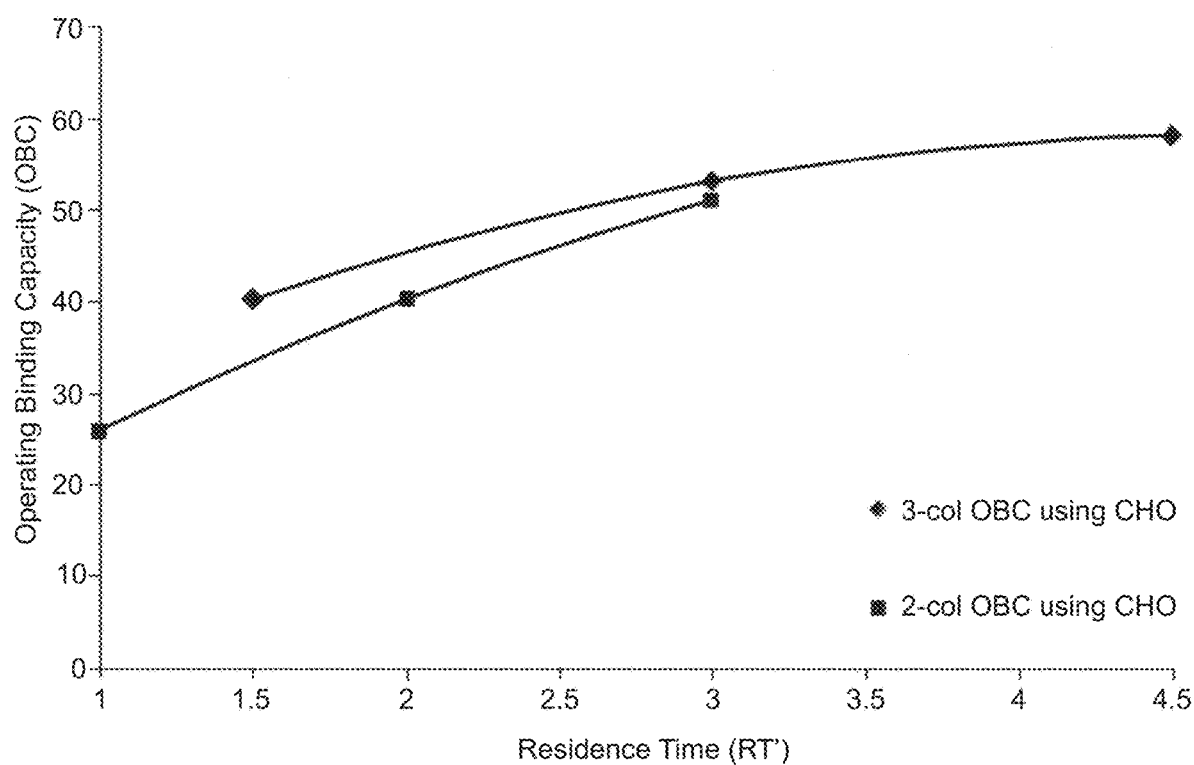

FIG. 7 shows illustrative operating binding capacities versus total residence time for two and three columns as described in Examples 2 and 8.

Figure 8:
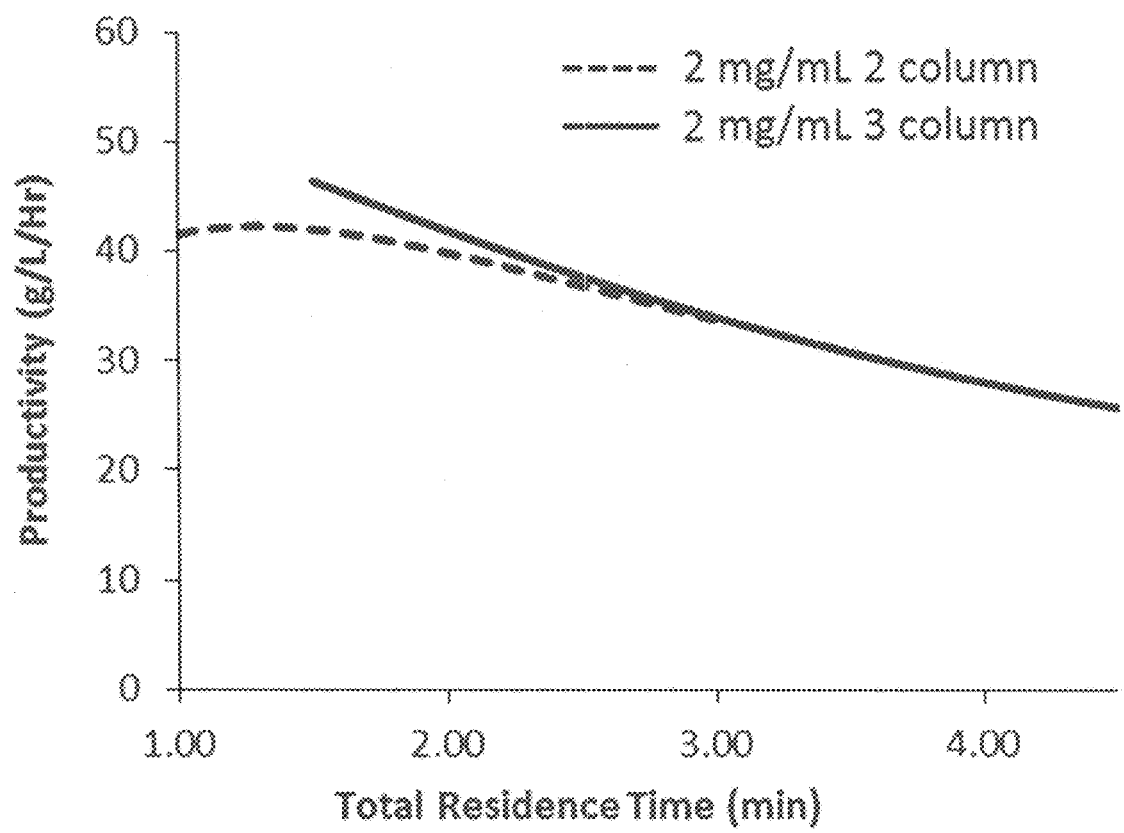

FIG. 8 shows theoretical productivity versus total residence time for two and three columns as described in Examples 2 and 8.

Figure 9:
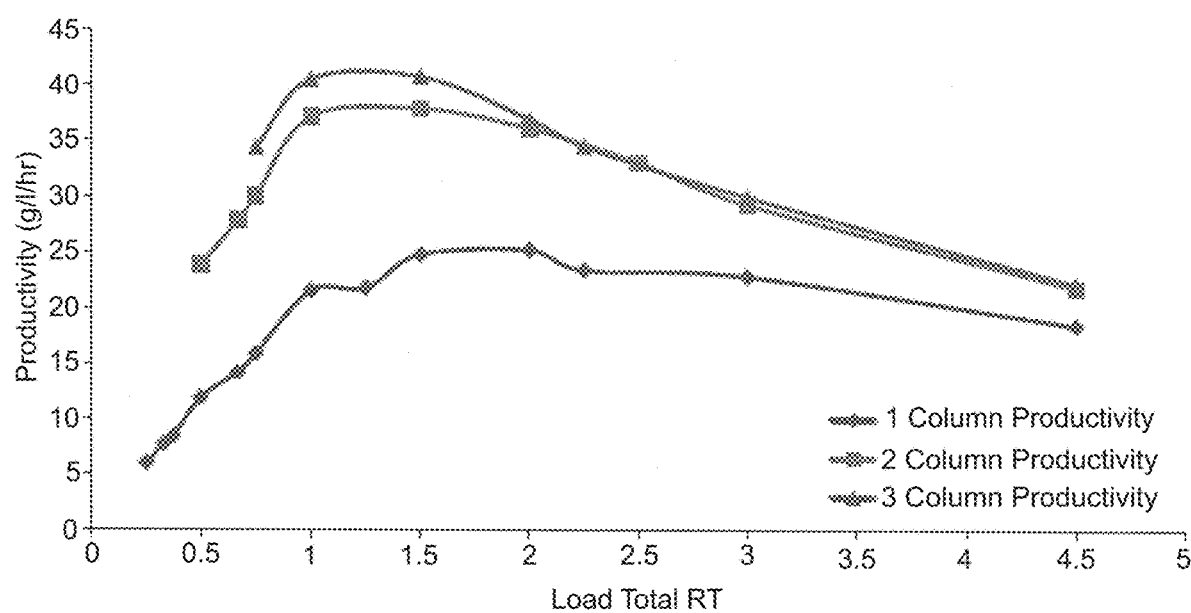

FIG. 9 shows a predictive model providing optimum productivity usable to select a MCC process strategy, wherein the process modeling strategy is applied to breakthrough curves generated from 13 saturation breakthrough experiments performed on a single column.

DETAILED DESCRIPTION OF THE INVENTION

In accordance with the invention, an optimum operating binding capacity for a MCC process is determined. Thus, in one embodiment of a method according to the invention, two or more (typically, 2 to 12) loading experiments are performed on a single column at different residence times and/or different flow rates to determine an optimum operating binding capacity for the MCC process. Alternatively, in another embodiment, two or more columns of equal size can be placed in series ("daisy chained") and flow can be held constant to provide the desired residence times for determining the optimum operating binding capacity.

In accordance with embodiments of the invention, a column does not always have to be loaded with the target product to saturation. For example, it can be sufficient to achieve 10% or 20% breakthrough at the outlet of the column.

Embodiments of the method can include analyzing effluent fractions for breakthrough, or using a detector associated with an effluent line to determine the presence of the target product in the effluent line.

Advantageously, the determined optimum operating binding capacity represents, in a MCC process, the amount of target product bound by the first column immediately before breakthrough of the last column in the series. Preferably, an operational parameter (such as, e.g., an optimum amount of product to load in a multi-column process over a range of flow rates) can be determined using a few simple experiments performed on a single column. Accurate prediction of the operating capacities enables estimation of many other multi-column process parameters such as, for example, productivity, cycle time, total number of columns, and/or buffer utilization. The use of a range of flow rates provides data points which can be fit and interpolated to optimize one or more parameters of interest as a function of residence time.

Additional advantages include, for example, if the MCC process involves rapid processing of a fragile protein, the user can pinpoint exactly which operating parameters are needed to achieve the fastest processing time. If time is less important and a focus of the process is capacity utilization, capacity utilization can be optimized. If cost is a concern, the process economic software can be utilized to minimize cost. If desired, anything related to a multi-column chromatography process within a biopharmaceutical production site can be optimized.

In one embodiment, a method for optimizing operating binding capacity for a multiple column chromatography (MCC) process is provided, the method comprising (a) loading a target product on a column at a first residence time and/or at a first flow rate; (b) loading the target product on the column at a second residence time and/or at a second flow rate, wherein the first residence time and/or first flow rate is different than the second residence time and/or the second flow rate; (c) generating breakthrough curves for the first residence time and/or first flow rate and for the second residence time and/or the second flow rate; and (d) determining an optimum operating binding capacity for the MCC process. Typically, the second residence time is about double the first residence time and/or the second flow rate is about half the first flow rate.

In an embodiment, the MCC process includes N number of columns, and the first residence time and/or the first flow rate is determined for a single column, and the second residence time and/or the second flow rate equals the residence time and/or flow rate across the N number of columns.

In an embodiment, the method further comprises (b') loading the target product on the column at a third residence time and/or at a third flow rate, wherein the third residence time and/or third flow rate is different than the first and second residence times and/or the first and second flow rates; (c') generating breakthrough curves for the first residence time and/or first flow rate, for the second residence time and/or the second flow rate, and for the third residence time and/or the third flow rate; and (d) determining an optimum operating binding capacity for the MCC. Typically, the third residence time is about triple the first residence time and/or the third flow rate is about one-third the first flow rate.

In another embodiment, a method for optimizing operating binding capacity for a multiple column chromatography (MCC) process comprises (a) connecting at least two columns of equal size in series; (b) loading target product on the columns at a constant flow rate to provide predetermined residence times through the columns; and (c) determining an optimum operating binding capacity for the MCC process.

Using a two column system as an example, if desired, at beginning of the process, the first load step can have an increased load, wherein the load is X+Y, representing the amount bound to the first column (amount "X" in column "A") and the amount bound to the second column (amount "Y" in column "B"). Advantageously, this can "force" the system to start at steady state immediately, avoiding a transition to steady state that can be observed in some processes.

Figure 1A:
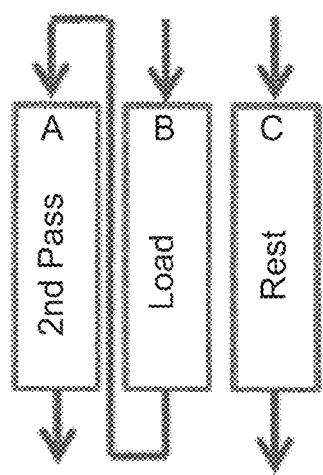
Figure 1B:
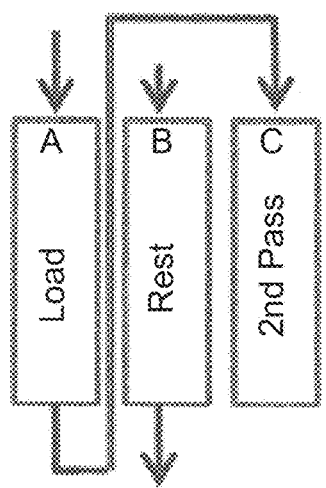
Figure 1C:
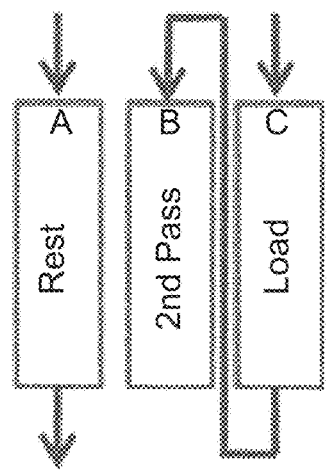

In order to provide a framework for understanding the invention, and using FIG. 1 for reference, it is desirable to operate MCC in steady-state such that each column is treated identically, and each cycle is the same. This ensures that productivity and product quality remains constant. In FIG. 1, when the B column moves out of the load zone, an amount of target product that is bound to the column is removed from the system as the column enters the rest stage (and is subsequently eluted). For operation to be at steady state, the same amount of target product from the feed sample must be added back to the system in the next load cycle. This identifies the binding capacity that the process is operated at, i.e., the operating binding capacity. The operating capacity is defined as gram of target product bound per liter of sorbent. The ideal operating binding capacity occurs when the second column in the series (receiving the second pass) is loaded until just before product breakthrough. At the ideal operating binding capacity as much target product as possible will be bound within the column receiving the feed sample load directly without any product loss.

Following flow through a single column and its time in the load zone, initially a column (column A in FIGS. 1A-1C) starts as the second column in the series. As such, the column A receives the flow-through from the first column in series, the load column (directly receiving feed), column B. Initially the load column will bind all of the target product, so that the load onto column A (the second pass) will not contain target product. As the load column approaches and then exceeds its dynamic binding capacity, target product will begin to flow through the load column. Thus the second pass column will initially receive product at zero concentration, but after a time the load concentration will begin to increase as more and more target product breaks-through the first column. After this phase is complete the column that was in the second pass becomes the load column and it receives load directly. The target product concentration loaded onto the column is relatively high and constant.

The desire is to apply as much target product to the load column as possible, without losing any target product. Accordingly, loading is stopped well before break-through of target from the second pass column (or if there are more than two columns in the series, the last column connected in the series). Determining the amount to load in a MCC process is complicated because of the multiple-step loading, i.e., a column will be in the second pass before being loaded directly. This makes it challenging to understand at what operating binding capacity a process should be performed.

The challenge becomes even more complex in view of residence time. Increasing residence time can increase capacity and lowering residence time may decrease capacity. However, increasing residence time is achieved by slowing the flow rate over the column and this requires increased time for the load step.

Since productivity can be understood as capacity/cycle time, long residence times that result in increased capacity also increase cycle time. The inventors have recognized that these two factors, capacity and cycle time, are both affected by the residence time, and realized that there is an optimum residence time to perform a MCC process to operate at optimum productivity. The inventors surprisingly and unexpectedly found that this multi-phase load did not have an effect on the capacity of the column or upon breakthrough of the target product from the column. Thus, the inventors realized that if columns are connected in series (and loaded straight through to saturation (in the absence of valve switching to simulate countercurrent movement of the columns), the amount of target product bound by the first column immediately before breakthrough of the last column in the series is the ideal operating binding capacity. The process is optimized: loading more target product results in target product loss, loading less target product results in less than optimal column utilization.

The following definitions are used in accordance with the invention.

Batch chromatography—traditional chromatography processes performed on a single column to saturation and producing a binding profile within the column that is almost identical to the binding profile of columns (connected in series) that are loaded iteratively in a multi-column capture process.

Binding capacity or capacity—mg of target or product bound per milliliter of sorbent.

Breakthrough curve—a plot of product concentration at the outlet of a column as the column is being loaded with fluid at its inlet (can be plotted vs. time, mass loaded, or volume loaded).

Breakthrough experiment—an experiment wherein a column is overloaded with product in order to ensure product breakthrough at the outlet so that a plot of the breakthrough curve can be obtained (column is typically loaded to 100% of its dynamic binding capacity).

Capture efficiency—percent of product loaded at the inlet of the column that is bound by the sorbent.

Column saturation—a point where the column is close 100% of its dynamic binding capacity and loading additional product at the inlet would not result in more capacity.

Cycle time—amount of time required for one column to complete an entire set (load, wash, elution, regeneration, and equilibration) of chromatography unit operations.

Dynamic binding capacity—mg of product bound per milliliter of sorbent under conditions where product in the mobile phase is flowing past the stationary phase.

Flow-through—the sum of product that has exited the outlet of column undergoing loading with feed material.

Load residence time—the residence time condition at which feed material (containing product) is loaded onto the column.

Load time—amount of time required to load the first column in the load phase of a multi-column chromatography process.

Load zone—the load phase of a multi-column chromatography process where two or more columns (connected in series) receive feed material either directly or indirectly.

Number of columns—total columns (filled with a given amount of sorbent volume) required to operate a multi-column chromatography process.

Operating binding capacity—amount of product that is loaded divided by the column volume.

Productivity—grams of product processed per liter of sorbent per hour (operating binding capacity/cycle time).

Residence time—the amount of time it takes for a non-interacting particle in the mobile phase to pass through the volume of stationary phase (sorbent volume/flow rate).

Rest or resting process—all of the steps within a chromatography cycle which do not involve loading product onto the sorbent (wash, elution, regeneration, equilibration).

Rest residence time—the residence time condition at which the rest process.

Sorbent/resin—a material composed of small porous polymer beads coated with ligands that have the desired chemistry necessary to capture product from the mobile phase in a chromatography process.

Static binding capacity—amount of product that stationary phase is capable of binding under the condition of no flow.

Start-up binding capacity—amount of product that is required to load in order to commence a multi-column process in steady state.

Steady state—an unvarying condition within a multi-column process where capacity, purity, and productivity are constant cycle after cycle.

80% of 10% DBC—80% of the volume required to achieve 10% of the feed concentration at the outlet of a column (typically used as an estimate of 0% dynamic binding capacity where no product is measureable at the outlet of the column).

Further to the framework for understanding the invention outlined above, in a MCC process with two columns, measuring the amount bound to the first column before breakthrough of product from the second (last) column in series can be accomplished using two columns connected in series with a detector for product at the end of each column. This allows one to follow the product breakthrough of the first column using the detector placed between the two columns. The product breakthrough can be represented as a graph of product concentration in the flowthrough versus time (or load amount of product loaded). With such a graph, called a break-through curve, an initial phase is normally seen where the entire target is bound, so the concentration at the detector is zero. When the product breaks-through and plotted a graph, the shape often approaches sigmoidal. The area in the graph above the breakthrough curve represents the amount of material bound to the column. The area below the curve represents the amount of material that has flowed through the column. This single breakthrough shows the optimum time to stop loading for a single column operation, i.e., just before product breakthrough.

However, with a multi-column operation, the first column is loaded in series until the product starts to break-through the last column in series. Thus, a detector is needed after the last column in series to identify the time (or volume or amount of product loaded) when product breaks through. This information is used to constrain the area of the first columns breakthrough by limiting the time (and therefore the amount loaded) on the chart of concentration of target vs time. This allows determination of operating capacity which is the amount of target bound to the first column before breakthrough of the second column.

Alternatively (i) the breakthrough curve of the load column could be measured by using a single column with a detector after it, and (ii) the other breakthrough curve could be determined by connecting two or more columns in series with a single detector at the end of the columns.

Unexpectedly, another option for generating breakthrough curves is found, based on the realization that the shape of the product breakthrough curve is almost completely dependent on the residence time applied when loading a column. This surprising result enables generation of the two breakthrough curves with just a single column and single detector after the column, rather than with two columns, each having a detector after each column. To mimic the MMC situation one breakthrough curve is performed at a chosen residence time, and to mimic two columns in series, another breakthrough curve is performed at double the chosen residence time. The breakthrough curve at the chosen residence time is used to calculate the amount bound to what would be the first column in series, where the area above the breakthrough curve is representative of the amount bound to the column. The break-through at double the residence time is representative of the second column in series and is necessary to inform how much product could be loaded in MCC without incurring product loss to the flow through. This breakthrough information is used to determine a limit as to how much product is loaded, and calculate a loading time or amount limit to the initial breakthrough curve. With these two breakthrough curves it is possible to determine the amount bound to the first column before breakthrough of the second column, which is the operating binding capacity. This can be extended to three or more columns in series. Illustratively, for three columns in series the second breakthrough curve would be performed at three times the chosen residence time, and so on.

With this framework in mind, optimizing productivity of an MCC process can be described. The framework above describes determining the operating binding capacity at a single residence time. However, to better optimize an MCC process, a series of residence times should be investigated. This is because longer residence times may lead to higher column capacity. However, longer residence times are at the cost of lower load flow-rates, which increase cycle times. Since productivity equals capacity divided by cycle time, residence time changes the numerator (capacity) and the denominator (cycle time). Additionally, it is advantageous to determine if there are benefits of adding more columns to the load zone. Adding more columns may also lead to higher capacity, since the first column in series can be loaded for even longer as there are additional columns in the series to capture the product in the flow-through. However, adding more columns to the load zone results in an increased cycle time. Accordingly, residence time as well as the number of columns in the load zone should be evaluated to determine the productivity maxima (optimized MCC process).

In accordance with a preferred embodiment of a method according to the invention, the capacity is measured for at least two, and preferably three or more, residence times. This allows a model to be created for capacity versus residence time.

To understand the advantages of two versus three (or more) columns in series, breakthrough curves can be provided to model these scenarios.

For example, looking at a single column, breakthrough curves could be performed with residence times of 0.5, 1, and 1.5 minutes. The amount bound to the column would be represented by the area above the breakthrough curve. However, a second breakthrough curve representing product breakthrough of the last column (in a MCC process) is required to limit the load, otherwise, when transferring the single column breakthrough amount to a MCC process, product would be lost.

To determine the point where product would breakthrough, breakthrough curves corresponding to two columns in series would be performed at double the chosen residence times (in the example above, 0.5, 1, and 1.5 minutes) to give break-through curves at 1, 2 and 3 minutes residence time. To model the corresponding three columns in series, breakthrough curves would be performed at triple the residence times (1.5 minutes (3×0.5 minutes), 3 minutes (3×1 minute) and 4.5 minutes (3×1.5 minutes) times, and so on.

By choosing residence times (0.5 minutes (1×), 1 minute (2×) and 1.5 minutes (3×)) it is possible to limit the total number of breakthrough curves required to model the experimental space to six, as there can be overlap or redundancy in residence times (highlighted in bold in this section). Further to the example above, in order to determine how product is bound to the first column in an MCC process, breakthrough curves could be generated at 0.5 minutes, 1 minute, and 1.5 minutes. Thus, the area above the curve is equal to the amount bound by the column. However, additional breakthrough curves are required to determine the point at which to stop loading so that product does not breakthrough on the last column. For two column loading, this means generating an additional set of breakthrough curves at 1 minute (2×0.5), 2 minutes (2×1) and 3 minutes (2×1.5). For three column loading, another set of breakthrough curves at 1.5 minutes (3×0.5), 3 minutes (3×1) and 4.5 minutes (3×1.5) residence times are required. Since the 1 minute, 1.5 minutes, and 3 minutes residence time breakthrough curves are repetitive, the experiment can be performed once but the results can be applied to more than one scenario. As a result, only six single column breakthrough curves are required.

For each breakthrough experiment, the column is loaded until it reaches a saturation point. The rest of the process cycle (such as, e.g., wash, elution, regeneration, and equilibration) are performed on the column using conditions specified by the technician.

If no specific detector exists to detect target breakthrough, the effluent exiting the column during the loading step is fractionated. Typically, about 25-50 fractions result in a sample set large enough to get a good representation of a breakthrough curve. Concentration of the target in the fractions is quantified using an analytical technique suited for that application.

From this data it is possible to observe the dependence of operating binding capacity on residence time. The optimum residence time and productivity can be determined by employing a series of standard equations:
1. Load time=operating binding capacity multiplied by residence time divided by titer
2. Cycle time=Load time plus rest time
3. Productivity=operating binding capacity divided by cycle time.

To determine loading capacity for a multi-column process with N columns connected in series which are receiving feed, a pair of breakthrough curves attained using the given residence time and N times that residence time are used. The pair of curves is plotted together with time as the x-axis and concentration as the y-axis. The breakthrough curve with the larger residence time estimates the progression of product breakthrough at the outlet of the last column in an N column process versus time. This curve is used to select a point in time, T, where product is about to break through the outlet of the column.

The curve can be used to: (i) determine the time T10% at which the product concentration is reaching 10% of the product concentration in the feed sample and (ii) calculate T as being 80% of T10%. Alternatively, the curve can be used to: (i) determine the time T5% at which the product concentration is reaching 5% of the product concentration in the feed sample and (ii) calculate T as being 75% of T10%. T is used as an upper integration limit on the second breakthrough out of the pair (the one at lower residence time). This breakthrough curve is integrated from zero to the predefined upper limit T and represents the amount of product present in the flow through. The loading capacity is equal to: {[(mass of product loaded)−(mass of product in the flow-through)]/(column volume)}. The calculation for mass of product loaded is given by {(concentration of the feed) *(volume loaded−void volume)}.

This procedure can be applied to every pair of breakthrough curves associated with two column loading so that three loading capacities associated with the three given residence times. The capacities are can be plotted against residence time and fit using a $2^{nd}$ order polynomial in order to interpolate capacity values in between the fitted points. These steps are repeated to generate the same curve for a three column loading resulting in two capacities versus residence time plots. The interpolated capacities are used to calculate load time which is equal to: {(capacity*residence time)/(feed titer)}.

The load time is used to calculate the cycle time which equals {(load time)+(time to perform wash/elution/regeneration/equilibration steps)}. The cycle time is calculated for the range of interpolated capacities.

The productivity associated with each residence time is equal to {(capacity)/(cycle time)} and is calculated for the range of interpolated capacities resulting in a plot of theoretical productivity versus residence time.

The number of total columns required to run the process is the sum of the number of columns that are being loaded plus the number of columns required in the rest of the cycle (wash/elute/regeneration) such that loading is continuous and uninterrupted. This is equal to {(cycle time)/(load time)} and generates an indiscrete set of values for the number of total columns required.

To make the calculated total number of columns a discrete single digit value, idle time is added to cycle time by rounding the calculated values for total number of columns up and factoring them back into the equation for productivity {(productivity)*(total# columns)/[roundup(total # columns)]}. This converts the calculation for theoretical productivity into actual productivity.

Thus, by measuring the operating binding capacity at a series of residence times, an optimum productivity for operating MCC can be calculated along with various parameters for operating at that productivity. Parameters of importance include, for example, operating binding capacity, residence time, number of columns in the load zone, and cycle time. This approach can be applied to different product titers. Advantageously, the robustness of the productivity can be determined. Alternatively, or additionally, advantages in improving the upstream process to produce higher titers can also be ascertained.

A wide variety of chromatography columns including a variety of sorbents (e.g., beads) are suitable for use in the invention, and are known in the art.

In some embodiments, the chromatography columns are preassembled columns, e.g., wherein the sorbent(s) is/are sealed in the housings by the device manufacturer. In some other embodiments, the sorbent(s) is/are sealed in the housings by the end user. The devices can be suitable for treating a variety of fluids, e.g., to purify and/or concentrate one or more desired materials present in the fluids. For example, the devices can be suitable for treating process fluids such as fluids used in the biopharmaceutical industry, e.g., fluids including desirable material such as proteinaceous material, for example, antibodies (e.g., monoclonal antibodies), or recombinant proteins such as growth factors.

The sorbent(s) can have any desired characteristics, e.g., chromatography type, and a variety of beads, including commercially available beads can be used in accordance with the invention, and are known in the art. For example, a variety of ion-exchange beads can be used. In some embodiments, the sorbents can function under physiological pH and/or ionic strength. Suitable sorbents (e.g., resins) include charged (e.g., a positively charged or a negatively charged media), mixed-mode chromatography media, hydrophobic interactive chromatography (HIC) media, affinity chromatography (e.g., immobilized metal affinity chromatography (IMAC)) media, biospecific (e.g., immobilized Protein A) affinity chromatography media, hydrophobic charge induction chromatography (HCIC) media, and a thiophilic chromatography (TC) media.

The following examples further illustrate the invention but, of course, should not be construed as in any way limiting its scope.

In each of the following examples, the lowest residence time is chosen based on the physical limitations of the sorbent. The highest residence time is chosen based on the assumption that residence times above 1.5 minutes will not provide significant advantages in productivity.

In Examples 1-9, the sets of (three) operating capacities are plotted against total residence time and fit using a $2^{nd}$ order polynomial in order to interpolate OBC values in between the fitted points. OBC values can be fit using a variety of equations, including exponential functions of the form $A-Be^{-C(t)}$ which would provide the most accurate fit but may require more experimentation effort to properly implement.

Alternatively, users can perform more breakthrough experiments and find the true OBC over the range of total residence times rather than approximating the OBC values through interpolation with a $2^{nd}$ order polynomial.

A process scenario is selected from the set of calculated multi-column processes (across the range of residence times) based on productivity. Alternatively, each scenario that is modeled using an embodiment of the method can be input into any specialized software to estimate process cost of goods and optimize for cost savings.

Examples 1-4 and 9 utilize a single column, and Examples 5-8 utilize multiple daisy-chained columns.

Example 1

This example demonstrates determining OBC according to an embodiment of the invention, utilizing one column (MabSelect SuRe pre-packed Hi-Trap columns (0.962 mL)); using purified IgG2 monoclonal antibody (2 mg/mL concentration)) and one in-line UV detector.

(1) Three breakthrough experiments are performed on a single column at load residence times of 0.5 minutes, 1 minute, and 1.5 minutes. (2) An additional three experiments are performed at 2 minutes, 3 minutes, and 4.5 minutes residence time.

Typically, in modeling two and three columns in the load zone, batch breakthrough experiments are also performed at double and triple the residence times specified in (1) for a total of 9 experiments. However, there is overlap or redundancy (Table demonstrating overlap time below) among the residence times selected so that only three breakthrough experiments are performed in addition to those performed in (2).

| Residence Times | | |
|---|---|---|
| chosen | 2 column load zones | 3 column load zones |
| 0.5 | 1 | 1.5 |
| 1 | 2 | 3 |
| 1.5 | 3 | 4.5 |

To model N columns in load zone, batch breakthrough experiments are performed at N times the residence times specified in (1).

The columns are subjected to wash, elution, regeneration, and equilibration (collectively referred to as the "rest" process) in between each loading step as outlined in the following table.

| | Buffer/solution | Step length (CV) | Residence Time (minutes) |
|---|---|---|---|
| Wash 1 | 1× PBS | 5 | 0.5 |
| Wash 2 | 1× PBS + 0.5M NaCl | 10 | 0.5 |
| Wash 3 | 1× PBS | 5 | 0.5 |
| Elution buffer | 100 mM acetic acid pH 3.0 | 10 | 0.5 |
| CIP | 0.1M NaOH | 10 | 1 |
| Re-equil. | 1× PBS | 10 | 0.5 |

For the loading step in each batch breakthrough experiment, the column is loaded until it reaches saturation (i.e., conditions where the concentration of product coming out of the column equals the concentration of product entering the column)

Figure 2:
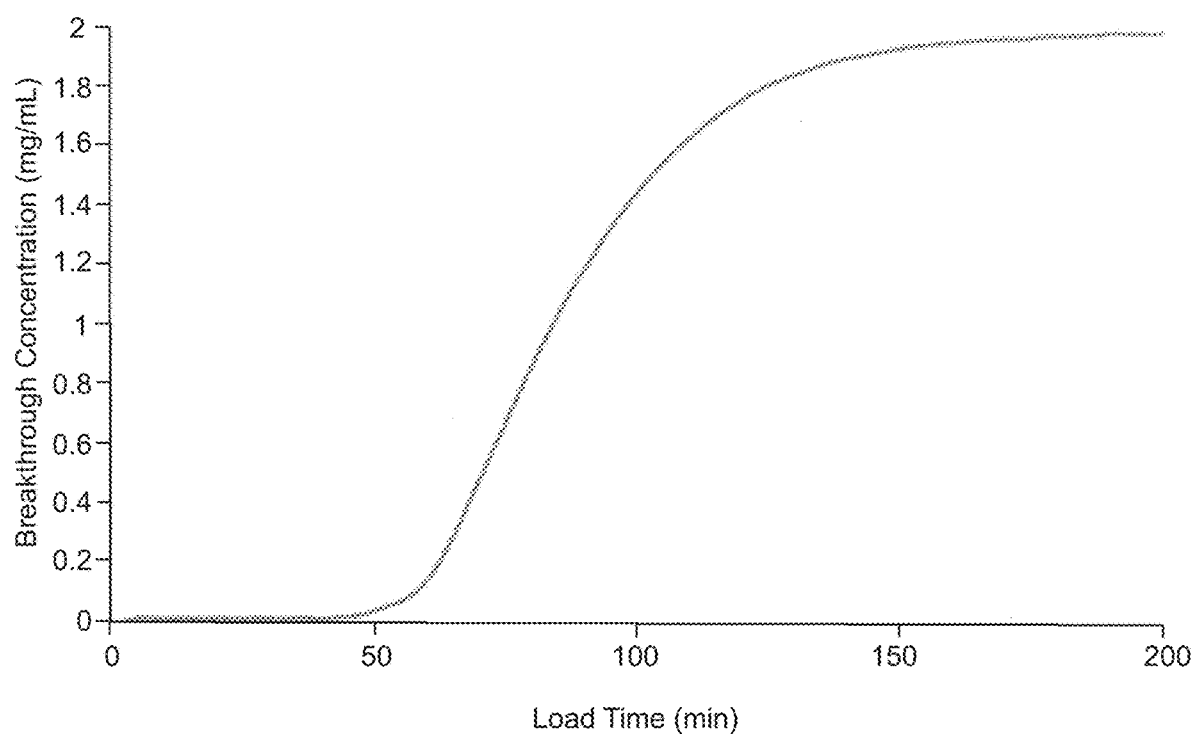
FIG. 2 shows an illustrative breakthrough curve generated via UV detection as described in Examples 1, 3, 6, and 7.

The concentration at the outlet of the column is measured using an in-line UV detector. The product breakthrough vs. time is recorded by the software and exported for the purpose of calculating the operating binding capacity. An illustrative curve is shown in FIG. 2.

Breakthrough curves are paired according to residence time in order to understand product breakthrough for a process with two columns in the load zone. For example, a breakthrough curve corresponding to the chosen residence time of 0.5 minutes is paired with a breakthrough curve corresponding to a 1 minute residence time. At double the residence time it is possible to mimic how product breaks through over time in a multi-column process with two columns in the load zone. This is done for all the chosen residence times listed in (1).

Breakthrough curves are paired according to residence time in order to mimic a process with three columns in the load zone. For example, a breakthrough curve corresponding to the chosen residence time of 0.5 minutes is paired with a breakthrough curve corresponding to a 1.5 minute residence time. At triple the residence time it is possible to mimic how product breaks through over time in a multi-column process with three columns in the load zone.

The ideal operating binding capacity for a multi-column process with N columns in the load zone is the amount bound to the first column immediately before breakthrough occurs at the outlet of the Nth column. In the previous two paragraphs, residence time is used to mimic a breakthrough curve that would normally be generated by daisy-chaining two columns and employing two UV detectors to trace product breakthrough (as depicted in FIGS. 4A and 4B). By varying residence time on a single column, it is possible to mimic product breakthrough across multiple columns (as depicted in FIG. 4C).

Each breakthrough curve corresponding to the larger residence time out of the pair identified above is used to determine a time, $t_{DBC}$, where product is about to breakthrough.

$t_{DBC}$ is calculated by identifying the time where 80% of the product mass required to produce 10% product breakthrough has been loaded.

$t_{DBC}$ is used as an upper integration limit on the second breakthrough out of each pair (the one corresponding to the lower residence time). This breakthrough curve is integrated from zero to the predefined upper limit $f_R*t_{DBC}$ to determine the amount of product present in the flow through as shown in equation 1 where $m_{FT}$ is the amount of product in the flow-through and $C_{out}$ represents the breakthrough curve corresponding to the lower residence time out of the pair identified above.

$$m_{FT} = \int_0^{f_R*t_{DBC}} C_{out} dv \qquad \text{Equation 1:}$$

The amount of product loaded, $m_L$ is calculated by applying the formula shown in equation 2 where $C_0$ is the feed concentration, $v_L$ is the volume that was loaded, and $v_0$ is the void volume within the column.

$$m_L = C_0*(v_L - v_0) \qquad \text{Equation 2:}$$

The ideal operating binding capacity (OBC) was calculated by applying the formula in equation 3.

$$OBC = (m_L - m_{FT})/v_{Col} \qquad \text{Equation 3:}$$

The process described above is applied to every pair of breakthrough curves to generate three operating binding capacities corresponding to a process with two columns in the load zone and three operating binding capacities corresponding to a process with three columns in the load zone.

Each set of (three) operating capacities are plotted against total residence time and fit using a $2^{nd}$ order polynomial in order to interpolate OBC values in between the fitted points. OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 5.

The interpolated operating binding capacities are used to calculate load time over a range of total residence times by applying the formula in equation 4 where RT is the residence time across one column (not the total residence time) and $C_0$ is the feed concentration.

$$t_L = OBC*RT/C_0 \qquad \text{Equation 4:}$$

The load time is used to calculate the cycle times over the range of total residence times. The calculation shown in equation 5 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L*N_L + t_R \qquad \text{Equation 5:}$$

The productivity associated with each residence time is calculated using equation 6 (below) where P is productivity.

$$P = OBC/t_C \qquad \text{Equation 6:}$$

A plot of theoretical productivity versus total residence time is shown in FIG. 6.

The number of total columns required to run the process is the sum of the number of columns that are being loaded plus the number of columns required in the rest (wash/elute/regeneration) such that loading is continuous and uninterrupted. This is calculated using equation 7 (below) where $N_C$ is the total number of columns.

$$N_C = \text{roundup}(t_C/t_L) \quad \text{Equation 7:}$$

The cycle time must be divisible by the number of columns. For situations where it is not divisible, idle time is added to cycle time. Increasing cycle time reduces productivity. The actual productivity is calculated using equation 8 (below).

$$P_{actual} = OBC/(N_C * t_L) \quad \text{Equation 8:}$$

A process scenario is selected from the set of calculated multi-column processes (across the range of residence times listed in (1)) based on productivity. Alternatively, each scenario that is modeled using this embodiment of the method can be input into any specialized software to estimate process cost of goods and optimize for cost savings.

Example 2

This example demonstrates determining OBC according to an embodiment of the invention, utilizing one column (MabSelect SuRe pre-packed Hi-Trap columns (0.962 mL)); using purified monoclonal IgG2 antibody (about 2.2 mg/mL concentration in CHO feedstock)) and quantification of fractionation using a commercially available biosensor.

(1) Three breakthrough experiments are performed on a single column at load residence times of 0.5 minutes, 1 minute, and 1.5 minutes. (2) An additional three experiments are performed at 2 minutes, 3 minutes, and 4.5 minutes residence time.

Typically, in modeling two and three columns in the load zone, batch breakthrough experiments are also performed at double and triple the residence times specified in (1) for a total of 9 experiments. However, there is overlap or redundancy (Table demonstrating overlap time below) among the residence times selected so that only three breakthrough experiments are performed in addition to those performed in (2).

| Residence Times | | |
|---|---|---|
| chosen | 2 column load zones | 3 column load zones |
| 0.5 | 1 | 1.5 |
| 1 | 2 | 3 |
| 1.5 | 3 | 4.5 |

To model N columns in load zone, batch breakthrough experiments are performed at N times the residence times specified in (1).

The columns are subjected to wash, elution, regeneration, and equilibration (collectively referred to as the "rest" process) in between each loading step as outlined in the following table.

| Buffer/solution | | Step length (CV) | Residence Time (minutes) |
|---|---|---|---|
| Wash 1 | 1× PBS | 5 | 0.5 |
| Wash 2 | 1× PBS + 0.5M NaCl | 10 | 0.5 |
| Wash 3 | 1× PBS | 5 | 0.5 |
| Elution buffer | 100 mM acetic acid pH 3.0 | 10 | 0.5 |
| CIP | 0.1M NaOH | 10 | 1 |
| Re-equil. | 1× PBS | 10 | 0.5 |

For the loading step in each batch breakthrough experiment, the column is loaded until it reaches saturation (i.e., conditions where the concentration of product coming out of the column equals the concentration of product entering the column), or about 120 mg/mL of sorbent.

Figure 3:
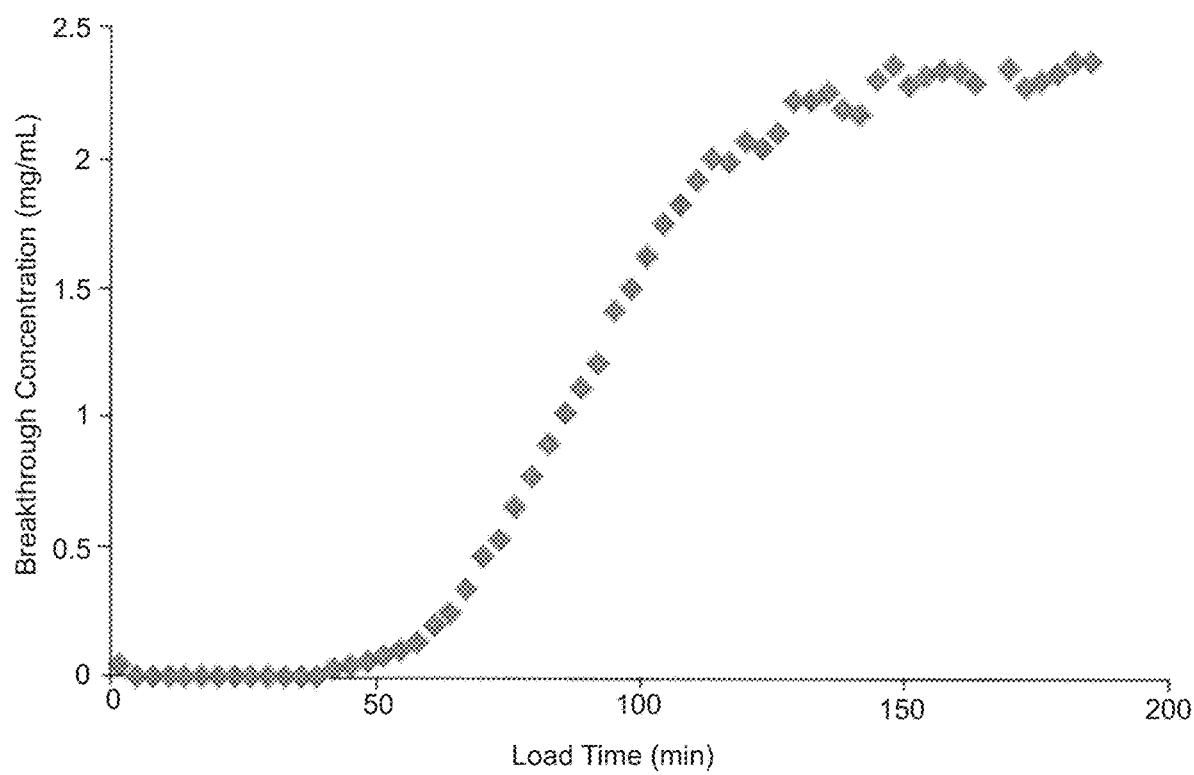
FIG. 3 shows an illustrative breakthrough curve generated via fractionation and quantitation as described in Examples 2, 4, 5, and 8.

The concentration at the outlet of the column is fractionated into 60 1 mL fractions using an AKTA™ Avant (GE Healthcare Lifesciences). Each fraction is diluted 10× using a diluent (Pall ForteBio LLC, Menlo Park, CA) and the concentration is quantified using protein A biosensors (Pall ForteBio LLC, Menlo Park, CA). Concentration values are plotted against time for the purpose of calculating the operating binding capacity, and an illustrative exported breakthrough curve is shown in FIG. 3.

Breakthrough curves are paired according to residence time in order to understand product breakthrough for a process with two columns in the load zone. For example, a breakthrough curve corresponding to the chosen residence time of 0.5 minutes is paired with a breakthrough curve corresponding to a 1 minute residence time. At double the residence time it is possible to mimic how product breaks through over time in a multi-column process with two columns in the load zone. This is done for all the chosen residence times listed in (1).

Breakthrough curves are paired according to residence time in order to mimic a process with three columns in the load zone. For example, a breakthrough curve corresponding to the chosen residence time of 0.5 minutes is paired with a breakthrough curve corresponding to a 1.5 minute residence time. At triple the residence time it is possible to mimic how product breaks through over time in a multi-column process with three columns in the load zone.

The ideal operating binding capacity for a multi-column process with N columns in the load zone is the amount bound to the first column immediately before breakthrough occurs at the outlet of the Nth column. In the previous two paragraphs, residence time is used to mimic a breakthrough curve that would normally be generated by daisy-chaining two columns and employing two UV detectors to trace product breakthrough as depicted in FIGS. 4A and 4B. By varying residence time on a single column, it is possible to mimic product breakthrough across multiple columns as depicted in FIG. 4C.

Each breakthrough curve corresponding to the larger residence time out of the pair identified above is used to determine a time, $t_{DBC}$, where product is about to breakthrough.

$t_{DBC}$ is calculated by identifying the time where 80% of the product mass required to produce 10% product breakthrough has been loaded.

$t_{DBC}$ is used as an upper integration limit on the second breakthrough out of each pair (the one corresponding to the lower residence time). This breakthrough curve is integrated from zero to the predefined upper limit $f_R * t_{DBC}$ to determine the amount of product present in the flow through as shown in equation 1 where $m_{FT}$ is the amount of product in the flow-through and $C_{out}$ represents the breakthrough curve corresponding to the lower residence time out of the pair identified above.

$$m_{FT}=\int_0^{f_R*t_{DBC}} C_{out} dv \qquad \text{Equation 1:}$$

The amount of product loaded, $m_L$ is calculated by applying the formula shown in equation 2 where $C_0$ is the feed concentration, $v_L$ is the volume that was loaded, and $v_0$ is the void volume within the column.

$$m_L=C_0*(v_L-v_0) \qquad \text{Equation 2:}$$

The ideal operating binding capacity (OBC) was calculated by applying the formula in equation 3.

$$OBC=(m_L-m_{FT})/v_{Col} \qquad \text{Equation 3:}$$

The process described above is applied to every pair of breakthrough curves to generate three operating binding capacities corresponding to a process with two columns in the load zone and three operating binding capacities corresponding to a process with three columns in the load zone.

Each set of (three) operating capacities are plotted against total residence time and fit using a $2^{nd}$ order polynomial in order to interpolate OBC values in between the fitted points. OBC values can be fit using a variety of equations, including exponential functions of the form $A-Be^{-C(t)}$ which would provide the most accurate fit but require more experimentation effort to properly implement. An example of operating binding capacity versus total residence time is shown in FIG. 7.

The interpolated operating binding capacities are used to calculate load time over a range of total residence times by applying the formula in equation 4 where RT is the residence time across one column (not the total residence time) and $C_0$ is the feed concentration.

$$t_L=OBC*RT/C_0 \qquad \text{Equation 4:}$$

The load time is used to calculate the cycle times over the range of total residence times. The calculation shown in equation 5 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C=t_L*N_L+t_R \qquad \text{Equation 5:}$$

The productivity associated with each residence time is calculated using equation 6 (below) where P is productivity.

$$P=OBC/t_C \qquad \text{Equation 6:}$$

A plot of theoretical productivity versus total residence time is shown in FIG. 8.

The number of total columns required to run the process is the sum of the number of columns that are being loaded plus the number of columns required in the rest (wash/elute/regeneration) such that loading is continuous and uninterrupted. This is calculated using equation 7 (below) where $N_C$ is the total number of columns.

$$N_C=\text{roundup}(t_C/t_L) \qquad \text{Equation 7:}$$

The cycle time must be divisible by the number of columns. For situations where it is not divisible, idle time is added to cycle time. Increasing cycle time reduces productivity. The actual productivity is calculated using equation 8 (below).

$$P_{actual}=OBC/(N_C*t_L) \qquad \text{Equation 8:}$$

Example 3

This example demonstrates determining OBC according to an embodiment of the invention, utilizing one column (MabSelect SuRe pre-packed Hi-Trap columns (0.962 mL)); using purified IgG2 monoclonal antibody (2 mg/mL concentration)) and quantification of elution (wherein the elution is collected in a fraction, diluted, and measured using an off-line detector) instead of integration of breakthrough curves.

(1) Three load experiments are performed on a single column at load residence times of 0.5 minutes, 1 minute, and 1.5 minutes. (2) Five breakthrough experiments are performed at 1 minute, 1.5 minutes, 2 minutes, 3 minutes, and 4.5 minutes residence time.

For the loading step in each batch breakthrough experiment, the column is loaded until it reaches saturation (i.e., conditions where the concentration of product coming out of the column equals the concentration of product entering the column).

The concentration at the outlet of the column is measured using an in-line UV detector. The product breakthrough vs. time is recorded by the software and exported for the purpose of calculating the operating binding capacity. An illustrative curve is shown in FIG. 2.

The load time, $t_{DBC}$, is calculated using breakthrough curves from each breakthrough experiment by identifying the time where 80% of the product mass required to produce 10% product breakthrough has been loaded.

To determine the operating binding capacity (OBC) for a process with two columns in the load zone, the column is loaded at a chosen residence time (for example, 0.5 minutes) using the load time determined by taking 80% of the 10% breakthrough of a curve generated by loading the column at double the chosen load residence time above (for example, 0.5*2=1 minutes residence time). This is repeated for the set of chosen load residence times specified in (1) for a total of three single column experiments.

After loading, the column is eluted using a buffer that guarantees 95% to 100% recovery of bound material and the elution is measured to determine how much was bound to the column. The amount that is bound is equal to the operating binding capacity for an MCC process with two columns in the load zone.

The ideal operating binding capacity for a multi-column process with N columns in the load zone is the amount bound to the first column immediately before breakthrough occurs at the outlet of the Nth column. In the previous two paragraphs, residence time is used to mimic a breakthrough curve that would normally be generated by daisy-chaining two columns and employing two UV detectors to trace product breakthrough as depicted in FIG. 4B (lower curve). This breakthrough curve is used to determine the amount to inject (X in the first column plus Y in the second column in FIG. 4A) through the first column in the series. The residence time is reduced by a factor of two and the column is loaded by this amount (X+Y). The amount that flows through is equal to Y, the amount that is bound is equal to X and represents the operating binding capacity or OBC.

Quantifying the elution for each of the three experiments generates three OBCs, each corresponding to a chosen residence time which can plotted and fit using a $2^{nd}$ order polynomial in order to interpolate OBC values in between the fitted points.

OBC values can be fit using a variety of equations, including exponential functions of the form $A-Be^{-C(t)}$ which would provide the most accurate fit but require more experimentation effort to properly implement. An example of operating binding capacity versus total residence time is shown in FIG. 5.

The experiments for the sets of chosen load residence times are repeated using load times calculated from breakthrough curves corresponding to triple the chosen residence times in order to model processes with three columns in the load zone.

Eluting and quantifying the elution are applied to the repeated experiments in order to plot OBCs against residence times that correspond to three columns in the load zone.

The interpolated operating binding capacities from the graph above can be used to calculate load time over a range of total residence times by applying the formula in equation 1 (below) where RT is the residence time across one column (not the total residence time) and $C_0$ is the feed concentration.

$$t_L = OBC * RT / C_0 \quad \text{Equation 1:}$$

The load time can be used to calculate the cycle times over the range of total residence times. The calculation shown in equation 2 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \quad \text{Equation 2:}$$

The productivity associated with each residence time was calculated using equation 3 (below) where P is productivity. A plot of theoretical productivity versus total residence time is shown in FIG. 6.

$$P = OBC / t_C \quad \text{Equation 3:}$$

The number of total columns required to run the process is the sum of the number of columns that are being loaded plus the number of columns required in the rest (wash/elute/regeneration) such that loading is continuous and uninterrupted. This was calculated using equation 4 (below) where $N_C$ is the total number of columns.

$$N_C = \text{roundup}(t_C / t_L) \quad \text{Equation 4:}$$

The cycle time must be divisible by the number of columns. For situations where it was not divisible, idle time was added to cycle time. Increasing cycle time reduces productivity. The actual productivity is calculated using equation 5 (below).

$$P_{actual} = OBC / (N_C * t_L) \quad \text{Equation 5:}$$

Example 4

This example demonstrates determining OBC according to an embodiment of the invention, utilizing one column (MabSelect SuRe pre-packed Hi-Trap columns (0.962 Ml)); using purified monoclonal antibody (2 mg/mL concentration)) and quantification of elution via fractionation using a commercially available biosensor.

(1) Three load experiments are performed on a single column at load residence times of 0.5 minutes, 1 minute, and 1.5 minutes. (2) Five breakthrough experiments are performed at 1 minute, 1.5 minutes, 2 minutes, 3 minutes, and 4.5 minutes residence time.

For the loading step in each batch breakthrough experiment, the column is loaded until it reaches saturation (i.e., conditions where the concentration of product coming out of the column equals the concentration of product entering the column).

The concentration at the outlet of the column is fractionated into 60 1 mL fractions using an AKTA™ Avant (GE Healthcare Lifesciences). Each fraction is diluted 10× using a diluent (Pall ForteBio LLC, Menlo Park, CA) and the concentration is quantified using protein A biosensors (Pall ForteBio LLC, Menlo Park, CA). Concentration values are plotted against time for the purpose of calculating the operating binding capacity, and an illustrative exported breakthrough curve is shown in FIG. 3.

The load time, $t_{DBC}$, is calculated using breakthrough curves from each breakthrough experiment by identifying the time where 80% of the product mass required to produce 10% product breakthrough has been loaded.

To determine the operating binding capacity (OBC) for a process with two columns in the load zone, the column is loaded at a chosen residence time (for example, 0.5 minutes) using the load time determined by taking 80% of the 10% breakthrough of a curve generated by loading the column at double the chosen load residence time above (for example, 0.5*2=1 minutes residence time). This is repeated for the set of chosen load residence times specified in (1) for a total of three single column experiments.

After loading, the column is eluted using a buffer that guarantees 95% to 100% recovery of bound material and the elution is measured to determine how much was bound to the column. The amount that is bound is equal to the operating binding capacity for an MCC process with two columns in the load zone.

The ideal operating binding capacity for a multi-column process with N columns in the load zone is the amount bound to the first column immediately before breakthrough occurs at the outlet of the Nth column. In the previous two paragraphs, residence time is used to mimic a breakthrough curve that would normally be generated by daisy-chaining two columns and employing two UV detectors to trace product breakthrough as depicted in FIG. 4B (lower curve). This breakthrough curve is used to determine the amount to inject (X in the first column plus Y in the second column in FIG. 4A) through the first column in the series. The residence time is reduced by a factor of two and the column is loaded by this amount (X+Y). The amount that flows through is equal to Y, the amount that is bound is equal to X and represents the operating binding capacity or OBC.

Quantifying the elution for each of the three experiments generates three OBCs, each corresponding to a chosen residence time which can plotted and fit using a $2^{nd}$ order polynomial in order to interpolate OBC values in between the fitted points.

OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 5.

The experiments for the sets of chosen load residence times are repeated using load times calculated from breakthrough curves corresponding to triple the chosen residence times in order to model processes with three columns in the load zone.

Eluting and quantifying the elution are applied to the repeated experiments in order to plot OBCs against residence times that correspond to three columns in the load zone.

The interpolated operating binding capacities from the graph above can be used to calculate load time over a range of total residence times by applying the formula in equation 1 (below) where RT is the residence time across one column (not the total residence time) and $C_0$ is the feed concentration.

$$t_L = OBC*RT/C_0 \qquad \text{Equation 1:}$$

The load time can be used to calculate the cycle times over the range of total residence times. The calculation shown in equation 2 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \qquad \text{Equation 2:}$$

The productivity associated with each residence time was calculated using equation 3 (below) where P is productivity. A plot of theoretical productivity versus total residence time is demonstrated in FIG. 6.

$$P = OBC/t_C \qquad \text{Equation 3:}$$

The number of total columns required to run the process is the sum of the number of columns that are being loaded plus the number of columns required in the rest (wash/elute/regeneration) such that loading is continuous and uninterrupted. This was calculated using equation 4 (below) where $N_C$ is the total number of columns.

$$N_C = \text{roundup}(t_C/t_L) \qquad \text{Equation 4:}$$

The cycle time must be divisible by the number of columns. For situations where it was not divisible, idle time was added to cycle time. Increasing cycle time reduces productivity. The actual productivity is calculated using equation 5 (below).

$$P_{actual} = OBC/(N_C * t_L) \qquad \text{Equation 5:}$$

Example 5

This example demonstrates determining OBC according to an embodiment of the invention, utilizing two and three columns (MabSelect SuRe pre-packed Hi-Trap columns (0.962 mL)); using purified IgG2 monoclonal antibody (2 mg/mL concentration)) daisy chained together and quantification of elution via fractionation using a commercially available biosensor.

(1a) Three breakthrough experiments are performed on two columns daisy-chained together at load residence times of 0.5 minutes, 1 minute, and 1.5 minutes across a single column in the chain. (1b) Three breakthrough experiments are performed on three columns daisy-chained together at load residence times of 0.5 minutes, 1 minute, and 1.5 minutes.

The concentration at the outlet of the daisy-chained columns is fractionated into 60 1 mL fractions using an AKTA™ Avant (GE Healthcare Lifesciences). Each fraction is diluted 10× using a diluent including Tween 20 and bovine serum albumin (BSA) (Pall ForteBio LLC, Menlo Park, CA) and the concentration is quantified using protein A biosensors (Pall ForteBio LLC, Menlo Park, CA). Concentration values are plotted against time for the purpose of calculating the operating binding capacity, and an illustrative exported breakthrough curve is shown in FIG. 3.

The load time, $t_{DBC}$, is calculated using breakthrough curves from each breakthrough experiment (1a; 1b) by identifying the time where 80% of the product mass required to produce 10% product breakthrough has been loaded.

To determine the operating binding capacity (OBC) for a process with two columns in the load zone, a single column is loaded at a chosen residence time (for example, 0.5 minutes) using the load time determined by taking 80% of the 10% breakthrough of a curve generated by loading two daisy-chained columns (that have the same individual residence time). This is repeated for the set of chosen load residence times specified in (1a) for a total of three single column experiments.

To determine the operating binding capacity (OBC) for a process with three columns in the load zone, a single column is loaded at a chosen residence time (for example, 0.5 minutes) using the load time determined by taking 80% of the 10% breakthrough of a curve generated by loading three daisy-chained columns (that have the same individual residence time). This is repeated for the set of chosen load residence times specified in (1b) for a total of three single column experiments.

After loading, the column is eluted using a buffer that guarantees 95% to 100% recovery of bound material and the elution is measured to determine how much was bound to the column. The amount that is bound is equal to the operating binding capacity for an MCC process with two columns in the load zone, and three columns in the load zone.

The ideal operating binding capacity for a multi-column process with N columns in the load zone is the amount bound to the first column immediately before breakthrough occurs at the outlet of the Nth column. In (1a) and (1b), breakthrough curves are generated by daisy-chaining two columns and three columns and employing one UV detector to trace product breakthrough as depicted in FIG. 4A and FIG. 4B (lower curve). Then, in a separate experiment, the columns are disconnected and loaded to the point in time when product would break through the last column in the daisy chain configuration. After loading, the amount of material that binds to the column is determined by quantifying the elution. This is the amount X bound to the first column before breakthrough occurs on the last column.

Quantifying the elution for each of the two sets of three experiments generates three OBCs, each corresponding to a chosen residence time which can plotted and fit using a $2^{nd}$ order polynomial in order to interpolate OBC values in between the fitted points.

OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 5.

The experiments are repeated using load times calculated from breakthrough curves corresponding to three daisy-chained columns in order to model processes with three columns in the load zone. Eluting and quantifying the elution are applied to the repeated experiments in order to plot OBCs against residence times that correspond to three columns in the load zone.

The interpolated operating binding capacities from the graph above can be used to calculate load time over a range of total residence times by applying the formula in equation 1 (below) where RT is the residence time across one column (not the total residence time) and $C_0$ is the feed concentration.

$$t_L = OBC*RT/C_0 \qquad \text{Equation 1:}$$

The load time can be used to calculate the cycle times over the range of total residence times. The calculation shown in equation 2 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \quad \text{Equation 2:}$$

The productivity associated with each residence time was calculated using equation 3 (below) where P is productivity. A plot of theoretical productivity versus total residence time is demonstrated in FIG. 5.

$$P = OBC/t_C \quad \text{Equation 3:}$$

The number of total columns required to run the process is the sum of the number of columns that are being loaded plus the number of columns required in the rest (wash/elute/regeneration) such that loading is continuous and uninterrupted. This was calculated using equation 4 (below) where $N_C$ is the total number of columns.

$$N_C = \text{roundup}(t_C/t_L) \quad \text{Equation 4:}$$

The cycle time must be divisible by the number of columns. For situations where it was not divisible, idle time was added to cycle time. Increasing cycle time reduces productivity. The actual productivity is calculated using equation 5 (below).

$$P_{actual} = OBC/(N_C * t_L) \quad \text{Equation 5:}$$

Example 6

This example demonstrates determining OBC according to an embodiment of the invention, utilizing two and three columns (MabSelect SuRe pre-packed Hi-Trap columns (0.962 mL); using purified IgG2 monoclonal antibody (2 mg/mL concentration)) daisy-chained together and quantification of elution (using an off-line UV detector) instead of integration of breakthrough curves.

(1a) Three breakthrough experiments are performed on two columns daisy-chained together at load residence times of 0.5 minutes, 1 minute, and 1.5 minutes. (1b) Three breakthrough experiments are performed on three columns daisy-chained together at load residence times of 0.5 minutes, 1 minute, and 1.5 minutes.

The concentration at the outlet of the daisy-chained columns is measured using an in-line UV detector. The product breakthrough vs. time is recorded by the software and exported for the purpose of calculating the operating binding capacity. An illustrative curve is shown in FIG. 2.

The load time, $t_{DBC}$, is calculated using breakthrough curves from each breakthrough experiment ((1a); (1b)) by identifying the time where 80% of the product mass required to produce 10% product breakthrough has been loaded.

To determine the operating binding capacity (OBC) for a process with two columns in the load zone, a single column is loaded at a chosen residence time (for example, 0.5 minutes) using the load time determined by taking 80% of the 10% breakthrough of a curve generated by loading two daisy-chained columns (that have the same individual residence time). This is repeated for the set of chosen load residence times specified in (1a) for a total of three single column experiments.

To determine the operating binding capacity (OBC) for a process with three columns in the load zone, a single column is loaded at a chosen residence time (for example, 0.5 minutes) using the load time determined by taking 80% of the 10% breakthrough of a curve generated by loading three daisy-chained columns (that have the same individual residence time). This is repeated for the set of chosen load residence times specified in (1b) for a total of three single column experiments.

After loading, the column is eluted using a buffer that guarantees 95% to 100% recovery of bound material and the elution is measured to determine how much was bound to the column. The amount that is bound is equal to the operating binding capacity for an MCC process with two columns in the load zone, and three columns in the load zone.

The ideal operating binding capacity for a multi-column process with N columns in the load zone is the amount bound to the first column immediately before breakthrough occurs at the outlet of the Nth column. In (1a) and (1b), breakthrough curves are generated by daisy-chaining two columns and three columns and employing one UV detector to trace product breakthrough as depicted in FIGS. 4A and 4B (lower curve). Then, in a separate experiment, the columns are disconnected and loaded to the point in time when product would break through the last column in the daisy chain configuration. After loading, the amount of material that binds to the column is determined by quantifying the elution. This is the amount X bound to the first column before breakthrough occurs on the last column.

Quantifying the elution for each of the two sets of three experiments generates three OBCs, each corresponding to a chosen residence time which can plotted and fit using a $2^{nd}$ order polynomial in order to interpolate OBC values in between the fitted points.

OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 5.

The experiments are repeated using load times calculated from breakthrough curves corresponding to three daisy-chained columns in order to model processes with three columns in the load zone. Eluting and quantifying the elution are applied to the repeated experiments in order to plot OBCs against residence times that correspond to three columns in the load zone.

The interpolated operating binding capacities from the graph above can be used to calculate load time over a range of total residence times by applying the formula in equation 1 (below) where RT is the residence time across one column (not the total residence time) and $C_0$ is the feed concentration.

$$t_L = OBC * RT / C_0 \quad \text{Equation 1:}$$

The load time can be used to calculate the cycle times over the range of total residence times. The calculation shown in equation 2 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \quad \text{Equation 2:}$$

The productivity associated with each residence time was calculated using equation 3 (below) where P is productivity. A plot of theoretical productivity versus total residence time is demonstrated in FIG. 6.

$$P = OBC/t_C \quad \text{Equation 3:}$$

The number of total columns required to run the process is the sum of the number of columns that are being loaded plus the number of columns required in the rest (wash/elute/regeneration) such that loading is continuous and uninterrupted. This was calculated using equation 4 (below) where $N_C$ is the total number of columns.

$$N_C = \text{roundup}(t_C/t_L) \quad \text{Equation 4:}$$

The cycle time must be divisible by the number of columns. For situations where it was not divisible, idle time was added to cycle time. Increasing cycle time reduces productivity. The actual productivity is calculated using equation 5 (below).

$$P_{actual} = OBC/(N_C * t_L) \quad \text{Equation 5:}$$

Example 7

This example demonstrates determining OBC according to an embodiment of the invention, utilizing two and three daisy-chained columns (MabSelect SuRe pre-packed Hi-Trap columns (0.962 mL)); using purified IgG2 monoclonal antibody (2 mg/mL concentration)) and one in-line UV detector.

(1a) Three breakthrough experiments are performed on a single column daisy-chained together at load residence times of 0.5 minutes, 1 minute, and 1.5 minutes. (1b) Three breakthrough experiments are performed on two columns daisy-chained together at load residence times of 0.5 minutes, 1 minute, and 1.5 minutes (i.e., the flow rate is kept the same, residence time across each column is kept the same, total combined residence time is doubled). (1c) Three breakthrough experiments are performed on three columns daisy-chained together at load residence times of 0.5 minutes, 1 minute, and 1.5 minutes (i.e., the flow rate is kept the same, residence time across each column is kept the same, total combined residence time is tripled).

To model N columns in load zone, batch breakthrough experiments are performed at N daisy-chained columns using the residence times specified in (1a).

The columns are subjected to wash, elution, regeneration, and equilibration (collectively referred to as the "rest" process) in between each loading step as outlined in the following table.

| | Buffer/solution | Step length (CV) | Residence Time (minutes) |
|---|---|---|---|
| Wash 1 | 1× PBS | 5 | 0.5 |
| Wash 2 | 1× PBS + 0.5M NaCl | 10 | 0.5 |
| Wash 3 | 1× PBS | 5 | 0.5 |
| Elution buffer | 100 mM acetic acid pH 3.0 | 10 | 0.5 |
| CIP | 0.1M NaOH | 10 | 1 |
| Re-equil. | 1× PBS | 10 | 0.5 |

For the loading step in each batch breakthrough experiment, the column is loaded until it reaches saturation (i.e., conditions where the concentration of product coming out of the column equals the concentration of product entering the column).

The concentration at the outlet of the column is measured using an in-line UV detector. The product breakthrough vs. time is recorded by the software and exported for the purpose of calculating the operating binding capacity. An illustrative curve is shown in FIG. 2.

Breakthrough curves generated using one column and two daisy-chained columns are paired with one another (share the same load flow rate) in order to mimic product breakthrough for a process with two columns in the load zone. For example, a breakthrough curve generated using one column and a load flow rate of 1 ml/min can be paired with a breakthrough curve generated using two columns and a load flow rate of 1 ml/min. This is done for all load flow rates associated with the residence times chosen in (1a).

Breakthrough curves generated using one column and three daisy-chained columns are paired with one another (share the same load flow rate) in order to mimic product breakthrough for a process with three columns in the load zone. For example, a breakthrough curve generated using one column and a load flow rate of 1 ml/min can be paired with a breakthrough curve generated using two columns and a load flow rate of 1 ml/min. This is done for all load flow rates associated with the residence times chosen in (1a).

The ideal operating binding capacity for a multi-column process with N columns in the load zone is the amount bound to the first column immediately before breakthrough occurs at the outlet of the Nth column. In the previous two paragraphs, breakthrough curves are generated by daisy-chaining two columns and three columns and employing one UV detector to trace product breakthrough as depicted in FIGS. 4A and 4B (lower curve). Then, in a separate experiment, the columns are disconnected and the experiment is performed on a single unit column in order to mimic product breakthrough across the very first column in the series to generate the curve depicted in FIG. 4B (upper curve).

The breakthrough curves corresponding to two or three columns identified above can be used to determine a time, $t_{DBC}$, where product is about to breakthrough.

$t_{DBC}$ is calculated by identifying the time where 80% of the product mass required to produce 10% product breakthrough has been loaded.

$t_{DBC}$ is used as an upper integration limit on the breakthrough generated by loading a single unit column. This breakthrough curve is integrated from zero to the upper limit $f_R * t_{DBC}$ to determine the amount of product present in the flow through as shown in equation 1 where $m_{FT}$ is the amount of product in the flow-through and $C_{out}$ represents the breakthrough curve corresponding to single unit column at a given load flow rate.

$$m_{FT} = \int_0^{f_R * t_{DBC}} C_{out} dv \quad \text{Equation 1:}$$

The amount of product loaded, $m_L$ is calculated by applying the formula shown in equation 2 where $C_0$ is the feed concentration, $v_L$ is the volume that was loaded, and $v_0$ is the void volume within the column.

$$m_L = C_0 * (v_L - v_0) \quad \text{Equation 2:}$$

The ideal operating binding capacity (OBC) is calculated by applying the formula in equation 3.

$$OBC = (m_L - m_{FT})/v_{Col} \quad \text{Equation 3:}$$

The process described above is applied to every pair of breakthrough curves to generate three operating binding capacities corresponding to a process with two columns in the load zone and three operating binding capacities corresponding to a process with three columns in the load zone.

Each set of (three) operating capacities are plotted against total residence time and fit using a $2^{nd}$ order polynomial in order to interpolate OBC values in between the fitted points. OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 5.

The interpolated operating binding capacities are used to calculate load time over a range of total residence times by applying the formula in equation 4 where RT is the residence time across one column (not the total residence time) and $C_0$ is the feed concentration.

$$t_L = OBC * RT / C_0 \qquad \text{Equation 4:}$$

The load time is used to calculate the cycle times over the range of total residence times. The calculation shown in equation 5 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \qquad \text{Equation 5:}$$

The productivity associated with each residence time is calculated using equation 6 (below) where P is productivity.

$$P = OBC / t_C \qquad \text{Equation 6:}$$

A plot of theoretical productivity versus total residence time is demonstrated in FIG. 6.

The number of total columns required to run the process is the sum of the number of columns that are being loaded plus the number of columns required in the rest (wash/elute/regeneration) such that loading is continuous and uninterrupted. This is calculated using equation 7 (below) where $N_C$ is the total number of columns.

$$N_C = \text{roundup}(t_C / t_L) \qquad \text{Equation 7:}$$

The cycle time must be divisible by the number of columns. For situations where it is not divisible, idle time is added to cycle time. Increasing cycle time reduces productivity. The actual productivity is calculated using equation 8 (below).

$$P_{actual} = OBC / (N_C * t_L) \qquad \text{Equation 8:}$$

Example 8

This example demonstrates determining OBC according to an embodiment of the invention, utilizing two and three daisy-chained column (MabSelect SuRe pre-packed Hi-Trap columns (0.962 mL)); using purified IgG2 monoclonal antibody (about 2.2 mg/mL concentration in CHO feedstock)) and fractionation using a commercially available biosensor.

(1a) Three breakthrough experiments are performed on a single column daisy-chained together at load residence times of 0.5 minutes, 1 minute, and 1.5 minutes. (1b) Three breakthrough experiments are performed on two columns daisy-chained together at load residence times of 0.5 minutes, 1 minute, and 1.5 minutes (i.e., the flow rate is kept the same, residence time across each column is kept the same, total combined residence time is doubled). (1c) Three breakthrough experiments are performed on three columns daisy-chained together at load residence times of 0.5 minutes, 1 minute, and 1.5 minutes (i.e., the flow rate is kept the same, residence time across each column is kept the same, total combined residence time is tripled).

To model N columns in load zone, batch breakthrough experiments are performed at N daisy-chained columns using the residence times specified in (1a).

The columns are subjected to wash, elution, regeneration, and equilibration (collectively referred to as the "rest" process) in between each loading step as outlined in the following table.

| Buffer/solution | | Step length (CV) | Residence Time (minutes) |
|---|---|---|---|
| Wash 1 | 1× PBS | 5 | 0.5 |
| Wash 2 | 1× PBS + 0.5M NaCl | 10 | 0.5 |
| Wash 3 | 1× PBS | 5 | 0.5 |
| Elution buffer | 100 mM acetic acid pH 3.0 | 10 | 0.5 |
| CIP | 0.1M NaOH | 10 | 1 |
| Re-equil. | 1× PBS | 10 | 0.5 |

For the loading step in each batch breakthrough experiment, the column is loaded until it reaches saturation (i.e., conditions where the concentration of product coming out of the column equals the concentration of product entering the column).

The concentration at the outlet of the column is fractionated into 60 1 mL fractions using an AKTA™ Avant (GE Healthcare Lifesciences). Each fraction is diluted 10× using a diluent (Pall ForteBio LLC, Menlo Park, CA) and the concentration is quantified using protein A biosensors (Pall ForteBio LLC, Menlo Park, CA). Concentration values are plotted against time for the purpose of calculating the operating binding capacity, and an illustrative exported breakthrough curve is shown in FIG. 3.

Breakthrough curves generated using one column and two daisy-chained columns are paired with one another (share the same load flow rate) in order to mimic product breakthrough for a process with two columns in the load zone. For example, a breakthrough curve generated using one column and a load flow rate of 1 ml/min can be paired with a breakthrough curve generated using two columns and a load flow rate of 1 ml/min. This is done for all load flow rates associated with the residence times chosen in (1a).

Breakthrough curves generated using one column and three daisy-chained columns are paired with one another (share the same load flow rate) in order to mimic product breakthrough for a process with three columns in the load zone. For example, a breakthrough curve generated using one column and a load flow rate of 1 ml/min can be paired with a breakthrough curve generated using two columns and a load flow rate of 1 ml/min. This is done for all load flow rates associated with the residence times chosen in (1a).

The ideal operating binding capacity for a multi-column process with N columns in the load zone is the amount bound to the first column immediately before breakthrough occurs at the outlet of the Nth column. In the previous two paragraphs, breakthrough curves are generated by daisy-chaining two columns and three columns and employing one UV detector to trace product breakthrough as depicted in FIG. 4A and FIG. 4B (lower curve). Then, in a separate experiment, the columns are disconnected and the experiment is performed on a single unit column in order to mimic product breakthrough across the very first column in the series to generate the curve depicted in FIG. 4B (upper curve).

The breakthrough curves corresponding to two or three columns identified above can be used to determine a time, $t_{DBC}$, where product is about to breakthrough.

$t_{DBC}$ is calculated by identifying the time where 80% of the product mass required to produce 10% product breakthrough has been loaded.

$t_{DBC}$ is used as an upper integration limit on the breakthrough generated by loading a single unit column. This breakthrough curve is integrated from zero to the upper limit $f_R * t_{DBC}$ to determine the amount of product present in the flow through as shown in equation 1 where $m_{FT}$ is the amount of product in the flow-through and $C_{out}$ represents the breakthrough curve corresponding to single unit column at a given load flow rate.

$$m_{FT}=\int_0^{fR^{*t_{DBC}}} C_{out} dv \quad \text{Equation 1:}$$

The amount of product loaded, $m_L$ is calculated by applying the formula shown in equation 2 where $C_0$ is the feed concentration, $v_L$ is the volume that was loaded, and $v_0$ is the void volume within the column.

$$m_L = C_0 * (v_L - v_0) \quad \text{Equation 2:}$$

The ideal operating binding capacity (OBC) is calculated by applying the formula in equation 3.

$$OBC = (m_L - m_{FT})/v_{Col} \quad \text{Equation 3:}$$

The process described above is applied to every pair of breakthrough curves to generate three operating binding capacities corresponding to a process with two columns in the load zone and three operating binding capacities corresponding to a process with three columns in the load zone.

Each set of (three) operating capacities are plotted against total residence time and fit using a $2^{nd}$ order polynomial in order to interpolate OBC values in between the fitted points. OBC values can be fit using a variety of equations, including exponential functions of the form $A - Be^{-C(t)}$ which would provide the most accurate fit but require more experimentation effort to properly implement. An example of operating binding capacity versus total residence time is shown in FIG. 7.

The interpolated operating binding capacities are used to calculate load time over a range of total residence times by applying the formula in equation 4 where RT is the residence time across one column (not the total residence time) and $C_0$ is the feed concentration.

$$t_L = OBC * RT/C_0 \quad \text{Equation 4:}$$

The load time is used to calculate the cycle times over the range of total residence times. The calculation shown in equation 5 (below) is applied to each residence time where $t_C$ equals cycle time, $t_L$ equals load time, $N_L$ equals the number of columns in the load zone, and $t_R$ equals rest time or time to perform the wash, elution, and regeneration.

$$t_C = t_L * N_L + t_R \quad \text{Equation 5:}$$

The productivity associated with each residence time is calculated using equation 6 (below) where P is productivity.

$$P = OBC/t_C \quad \text{Equation 6:}$$

A plot of theoretical productivity versus total residence time is demonstrated in FIG. 8.

The number of total columns required to run the process is the sum of the number of columns that are being loaded plus the number of columns required in the rest (wash/elute/regeneration) such that loading is continuous and uninterrupted. This is calculated using equation 7 (below) where $N_C$ is the total number of columns.

$$N_C = \text{roundup}(t_C/t_L) \quad \text{Equation 7:}$$

The cycle time must be divisible by the number of columns. For situations where it is not divisible, idle time is added to cycle time. Increasing cycle time reduces productivity. The actual productivity is calculated using equation 8 (below).

$$P_{actual} = OBC/(N_C * t_L) \quad \text{Equation 8:}$$

Example 9

This example demonstrates accurately predicting capture efficiency using an embodiment of the invention.

Four MCC processes (wherein two columns are in the load zone and two are in the rest of the process) are carried out at five operating capacities. The results are as follows:

| Amount loaded (OBC) (mg/mL resin) | Predicted capture efficiency (%) | Actual capture efficiency (%) |
|---|---|---|
| 31.8 | 99.8 | 99.7 |
| 39.6 | 99.3 | 99.3 |
| 42.1 | 98.3 | 98 |
| 46.6 | 95 | 94.8 |
| 50.5 | 90 | 91.6 |

All measured capture efficiencies are within 2% of predicted capture efficiencies. This confirms that the approach used to calculate OBC is closely approximating the true OBC within an MCC process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   selecting a multiple column chromatography (MCC) process including multiple interconnected columns, to determine an optimum operating binding capacity for the MCC process;
   determining the optimum operating binding capacity for the MCC process by:
      providing a single chromatography column and a target product for determining the optimum operating binding capacity for the MCC process;
   loading the target product on the single column at a first residence time;
   loading the target product on the single column at a second residence time, wherein the second residence time is the first residence time multiplied by the number of interconnected columns in the selected MCC process;
   generating a first breakthrough curve for the first residence time at which the target product was loaded on the single column and a second breakthrough curve for the second residence time at which the target product was loaded on the single column, wherein the first breakthrough curve determines target product breakthrough for the first column of the selected MCC process and the second breakthrough curve determines target product breakthrough for a last column of the multiple interconnected columns of the selected MCC process;
   using the first and second breakthrough curves to determine target product loading capacity of the first column of the multiple interconnected columns of the selected MCC process before the determined target product breakthrough at the last column of the multiple interconnected columns of the selected MCC process; wherein the determined target product loading capacity of the first column of the multiple interconnected columns of the selected MCC process equals the determined optimum operating binding capacity for the selected MCC process; and
   analyzing target product of the selected MCC process using the determined optimum operating binding capacity for the MCC process.

2. The method of claim 1 wherein the selected MCC process has two interconnected columns and the second residence time is about double the first residence time.

3. The method of claim 1, further comprising
   loading the target product on the single column at a third residence time, wherein the third residence time is about triple the first residence time;
   generating a third breakthrough curve for the third residence time at which the target product was loaded on the single column, wherein the third breakthrough curve determines breakthrough for the third column of the selected MCC process, wherein the selected MCC process has three interconnected columns; and
   using the first and third breakthrough curves to determine a target product loading capacity of the first column of the selected MCC process with three interconnected columns before target product breakthrough at the third column of the selected MCC process with three interconnected columns; wherein the target product loading capacity of the first column equals the optimum operating binding capacity for the MCC process with three interconnected columns.

4. The method of claim 1, wherein the first breakthrough curve and second breakthrough curve present target product breakthrough as a function of target product concentration versus time.

5. A method comprising:
   selecting a multiple column chromatography (MCC) process including multiple interconnected columns, to determine an optimum operating binding capacity for the MCC process;
   determining the optimum operating binding capacity for the MCC process by:
      (a) loading a target product on a single column, three times, at a first residence time, a second residence time, and a third residence time, respectively, wherein the first residence time, the second residence time, and the third residence time are each different from one another;
      (b) loading the target product on the single column three more times at a fourth residence time, a fifth residence time, and a sixth residence time, respectively, wherein the fourth residence time, the fifth residence time, and the sixth residence time are equal to the first residence time, the second residence time, and the third residence time, and the third residence times, respectively, multiplied by the number of interconnected columns in the selected MCC process;
      (c) generating breakthrough curves for each of the first residence time, the second residence time, the third residence time, the fourth residence time, the firth residence time, and the sixth residence time at which the target product was loaded on the single column, wherein a first breakthrough curve, a second breakthrough curve, and a third breakthrough curve determine target product breakthrough for a first column of the selected MCC process in which the first column is loaded at the first residence time, the second residence time, and the third residence time, respectively, and the fourth breakthrough curve, the fifth breakthrough curve, and the sixth breakthrough curve determine target product breakthrough for a last column of the selected MCC process in which the first column is loaded at the first residence time, the second residence time, and the third residence time, respectively;
      (d) pairing together the first and fourth, second and fifth, and third and sixth breakthrough curves and using each pair to determine target product loading capacity of the first column of the selected MCC process determined by each pair before a determined target product breakthrough at the last column of the MCC process determined by each pair; wherein the determined target product loading capacity of the first column of the MCC process determined by each pair equals the determined optimum operating binding capacity for the MCC process determined by each pair;
      (e) associating optimum operating binding capacities derived from the first, second, and third pairs with the first, second and third residence times respectively to produce three associated optimum operating binding capacities;
      (f) using the three associating optimum operating binding capacities to derive a second-order polynomial function that determines optimum operating binding capacity for a given residence time; and (g) using the derived second order polynomial function to determine an optimum operating binding capacity for any residence time; and (h) analyzing target product of the selected MCC process using the determined optimum operating binding capacity for the MCC process.

* * * * *